US011936935B2

(12) United States Patent
Godsey et al.

(10) Patent No.: US 11,936,935 B2
(45) Date of Patent: Mar. 19, 2024

(54) ADAPTIVE BITRATE STREAMING TIME SHIFT BUFFER

(71) Applicant: Charter Communications Operating, LLC, St. Louis, MO (US)

(72) Inventors: Lanny Jason Godsey, Beverly, MA (US); John J. Valiquette, Arvada, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 237 days.

(21) Appl. No.: 17/396,973

(22) Filed: Aug. 9, 2021

(65) Prior Publication Data
US 2023/0041829 A1  Feb. 9, 2023

(51) Int. Cl.
*H04N 21/858* (2011.01)
*H04N 21/235* (2011.01)
*H04N 21/262* (2011.01)
*H04N 21/6587* (2011.01)

(52) U.S. Cl.
CPC ... *H04N 21/26241* (2013.01); *H04N 21/2353* (2013.01); *H04N 21/26275* (2013.01); *H04N 21/6587* (2013.01)

(58) Field of Classification Search
CPC ......... H04N 21/26241; H04N 21/2353; H04N 21/26275; H04N 21/6587; H04N 21/2187; H04N 21/2387; H04N 21/8456; H04N 21/2747
See application file for complete search history.

(56) References Cited

U.S. PATENT DOCUMENTS

| 6,973,667 B2 * | 12/2005 | Fritsch ............... H04N 21/6408 725/87 |
| 7,953,706 B2 | 5/2011 | Prahlad et al. |
| 8,218,538 B1 | 7/2012 | Chidambaram et al. |

(Continued)

OTHER PUBLICATIONS

Oracle, "Managing ZFS File Systems in Oracle Solaris 11.2", https://docs.oracle.com/cd/E36784_01/html_E36835/gaypb.html, p. 15, related to Checksums and Self-Healing Data, 330 pages, (Dec. 2014).

(Continued)

*Primary Examiner* — An Son P Huynh
(74) *Attorney, Agent, or Firm* — THE MARBURY LAW GROUP, PLLC

(57) ABSTRACT

Various embodiments describe methods, systems, and devices for deploying live media content as a time-shifted playback. Exemplary implementations may receive, from a client computing device, a content request for a time-shifted playback of live media content. The time-shifted playback may use a unique copy of a live media content configured for playback associated with the content request. The content request may indicate a past point in time in the live media content from which the time-shifted playback originates. The client computing device may be provided access to an assigned private path for accessing segments of the time-shifted playback starting from a requested segment that corresponds to the indicated past point in time. Access by the client computing device to further segments of the time-shifted playback may be prevented in response to determining that the subsequent content request for playback of the second live media content is received.

30 Claims, 10 Drawing Sheets

(56) References Cited

U.S. PATENT DOCUMENTS

| | | | |
|---|---|---|---|
| 8,677,430 B2* | 3/2014 | Mitsuji | H04N 21/8355 |
| | | | 705/906 |
| 8,875,175 B1* | 10/2014 | McCoy | H04N 21/6543 |
| | | | 725/115 |
| 9,319,753 B2* | 4/2016 | Zhu | H04N 21/234336 |
| 9,767,130 B2 | 9/2017 | Bestler et al. | |
| 10,061,613 B1 | 8/2018 | Brooker et al. | |
| 10,097,883 B1* | 10/2018 | Rasool | H04N 21/2387 |
| 10,432,721 B2 | 10/2019 | Vermeulen et al. | |
| 10,972,761 B2* | 4/2021 | Ra | H04N 21/23113 |
| 2002/0124099 A1 | 9/2002 | Srinivasan et al. | |
| 2002/0124262 A1* | 9/2002 | Basso | H04N 7/17336 |
| | | | 725/110 |
| 2003/0149988 A1* | 8/2003 | Ellis | H04N 21/262 |
| | | | 725/62 |
| 2003/0236895 A1 | 12/2003 | Ohkubo et al. | |
| 2004/0230994 A1 | 11/2004 | Urdang et al. | |
| 2007/0294500 A1* | 12/2007 | Falco | H04N 21/47202 |
| | | | 386/E5.052 |
| 2009/0298485 A1* | 12/2009 | Lee | H04N 21/6131 |
| | | | 386/241 |
| 2010/0223392 A1* | 9/2010 | Pond | H04N 21/6405 |
| | | | 709/231 |
| 2011/0078750 A1 | 3/2011 | Tam et al. | |
| 2011/0107365 A1* | 5/2011 | Chen | H04N 21/2541 |
| | | | 725/116 |
| 2011/0246621 A1* | 10/2011 | May, Jr. | H04N 21/8543 |
| | | | 709/219 |
| 2014/0074961 A1* | 3/2014 | Liu | H04N 21/23106 |
| | | | 709/213 |
| 2014/0149533 A1* | 5/2014 | Bergman | H04N 21/23106 |
| | | | 709/213 |
| 2014/0230003 A1* | 8/2014 | Ma | H04N 21/4147 |
| | | | 725/115 |
| 2015/0288732 A1* | 10/2015 | Phillips | H04N 21/23439 |
| | | | 709/219 |
| 2016/0366226 A1 | 12/2016 | Friedman et al. | |
| 2017/0019439 A1* | 1/2017 | Kim | H04L 65/4084 |
| 2017/0085933 A1* | 3/2017 | Czeck, Jr. | H04N 21/812 |
| 2017/0374116 A1* | 12/2017 | Phillips | H04W 4/029 |
| 2018/0255362 A1* | 9/2018 | Chittella | H04N 21/234363 |
| 2019/0028758 A1* | 1/2019 | Talvensaari | H04N 21/4788 |
| 2019/0069006 A1* | 2/2019 | Rachabathuni | |
| | | | H04N 21/234336 |
| 2021/0084382 A1* | 3/2021 | Kellicker | H04N 21/2407 |
| 2021/0297718 A1* | 9/2021 | Chundi | H04N 21/26241 |

OTHER PUBLICATIONS

U.S. Appl. No. 17/396,962, filed Aug. 9, 2021—Non-Final Office Action dated Mar. 16, 2023, 19 pages.

U.S. Appl. No. 17/396,962, filed Aug. 9, 2021—Final Office Action dated Aug. 31, 2023, 14 pages.

Co-Pending U.S. Appl. No. 17/396,962, filed Aug. 9, 2021.

* cited by examiner

ADAPTIVE BITRATE STREAMING TIME SHIFT BUFFER

BACKGROUND

Conventional adaptive bitrate (ABR) streaming of live video typically lacks the ability to pause, rewind, or fast forward. Conventional streaming devices lack sufficient storage to do so; it is simply a live video display. Although some ABR media players allow the viewer to stop playback, when the playback starts again the video will jump forward as if the video had never stopped playing. In this way, any streaming video that would have been viewed during the pause in playback will be missed.

While live streaming media players do not generally have sufficient storage to allow pause, rewind, or fast forward, it is also generally cost prohibitive for media servers to record the delivered stream of live media content for individual customers. For content distributors the cost is high because they offer thousands of channels and have many millions of subscribers (i.e., customers), so making customized recordings for individual customers would require many millions of copies of media content being regularly made. Some de-duplication techniques are known, such as those that match portions of files, blocks, or groups of blocks with their respective checksums, to have matching portions use the same storage space, but implementing such techniques may be computationally costly. Further, matching checksums requires the entirety of each media content being checked to be stored in memory, which is memory intensive. Also, the media content being checked and compared must be stored on the same physical server, which limits scaling.

Time shifting live media content is also prevented by copyright and other laws and regulations, which prohibit or restrict the copying of live media content by content delivery networks. Such prohibitions or restrictions limit how delivery of live media content is performed, such as via hypertext transfer protocol (HTTP).

SUMMARY

Various aspects include methods for deploying live media content as a time-shifted playback. One aspect of the present disclosure includes receiving, from a client computing device, an initial content request for a time-shifted playback of live media content. The time-shifted playback of the live media content may use a unique copy of a first live media content configured for playback associated with the initial content request. The initial content request may indicate a past point in time in the first live media content from which the time-shifted playback of the live media content originates. Access may be enabled, for the client computing device, to an assigned private path for accessing segments of the time-shifted playback of the live media content starting from a requested segment that corresponds to the indicated past point in time; determining whether a subsequent content request for playback of a second live media content is received; and preventing access by the client computing device to further segments of the time-shifted playback of the live media content in response to determining that the subsequent content request for playback of the second live media content is received.

Some embodiments further include maintaining access by the client computing device to further segments of the time-shifted playback of the live media content in response to determining that the subsequent content request for playback of the second live media content is not received. Preventing access by the client computing device to further segments of the time-shifted playback of the live media content may include deleting one or more segments of the time-shifted playback of the live media content from a buffer.

Some embodiments further include assigning a session key associated with the assigned private path for accessing the segments of the time-shifted playback of the live media content, wherein determining whether the subsequent content request for playback of a second live media content is received includes determining whether the subsequent content request includes the assigned session key. The initial content request may include a time interval that provides the indication of the past point in time of the first live media content from which the playback of the time-shifted playback of the live media content should begin.

Some embodiments further include determining a target segment of the time-shifted playback of the live media content that corresponds to the past point in time of the first live media content, wherein the assigned private path at least initially accesses the target segment of the time-shifted playback of the live media content.

Some embodiments further include sending, to an object store, a request for one or more object files corresponding to segments of the first live media content; and compiling the time-shifted playback of the live media content from one or more object files received from the object store and completion data stored separately from the object files. The completion data may enable playback of the time-shifted playback of the live media content.

Some embodiments further include creating a record of the initial content request, wherein the record includes completion data for object files corresponding to segments of the first live media content stored separately from the record. The completion data may enable the time-shifted playback of the live media content, wherein the completion data is unique to the initial content request. The assigned private path for accessing segments of the time-shifted playback of the live media content may direct the client computing device through a proxy to the time-shifted playback of the live media content that is assembled from the object files and respective completion data. The completion data may include information originally part of the live media content that is absent from the object file of the time-shifted playback of the live media content.

Some embodiments further include determining whether a copy of the first live media content is being or has already been made. In response to determining that no copy of the first live media content is being or has already been made generating the object files corresponding to the segments of the first live media content. The object files may be sent to an object store.

Various aspects include methods for reducing the duplication of live media content stored by a computing device for later deployment as a time-shifted playback. One aspect of the present disclosure includes receiving, from a client computing device, an initial content request for a time-shifted playback of live media content, wherein the time-shifted playback of the live media content is a unique copy of a first live media content. A record of the initial content request may be created, wherein the record includes completion data for object files corresponding to segments of the first live media content stored separately from the record. The completion data may enable playback of the time-shifted playback of the live media content, wherein the completion data is unique to the initial content request. The time-shifted playback of the live media content may be compiled from the object files received from an object store and the completion data, wherein the compiled time-shifted playback of the live media content is unique to the initial content request as compared to compilations for other content requests. A private path for the client computing device may be assigned to access the compiled time-shifted playback of the live media content via a private path. Access for the client computing device may be enabled to the assigned private path for accessing segments of the compiled time-shifted playback of the live media content.

Some embodiments further include determining whether a prior content request was received for a playback of the first live media content. The object files may be generated in response to determining that a prior content request was not received for playback of the first live media content. Generating the object files may include generating a copy of live media content files that are each missing a set of bytes included in original live media content files. Each of the segments of the first live media content may be associated with different intervals of time from when the first live media content was shared. The completion data may include elements copied from original live media content files. A determination may be made as to whether a prior content request was received for playback of the first live media content uses a hash function representation of a file name corresponding to the live media content. The record may further include the file name and the assigned private path for the client computing device to access the compiled time-shifted playback of the live media content.

Further aspects may include a computing device having a processor configured to perform one or more operations of the methods summarized above. Further aspects may include a non-transitory processor-readable storage medium having stored thereon processor-executable instructions configured to cause a processor of a computing device to perform operations of the methods summarized above. Further aspects include a computing device having means for performing functions of the methods summarized above.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

DETAILED DESCRIPTION

Figure 1:
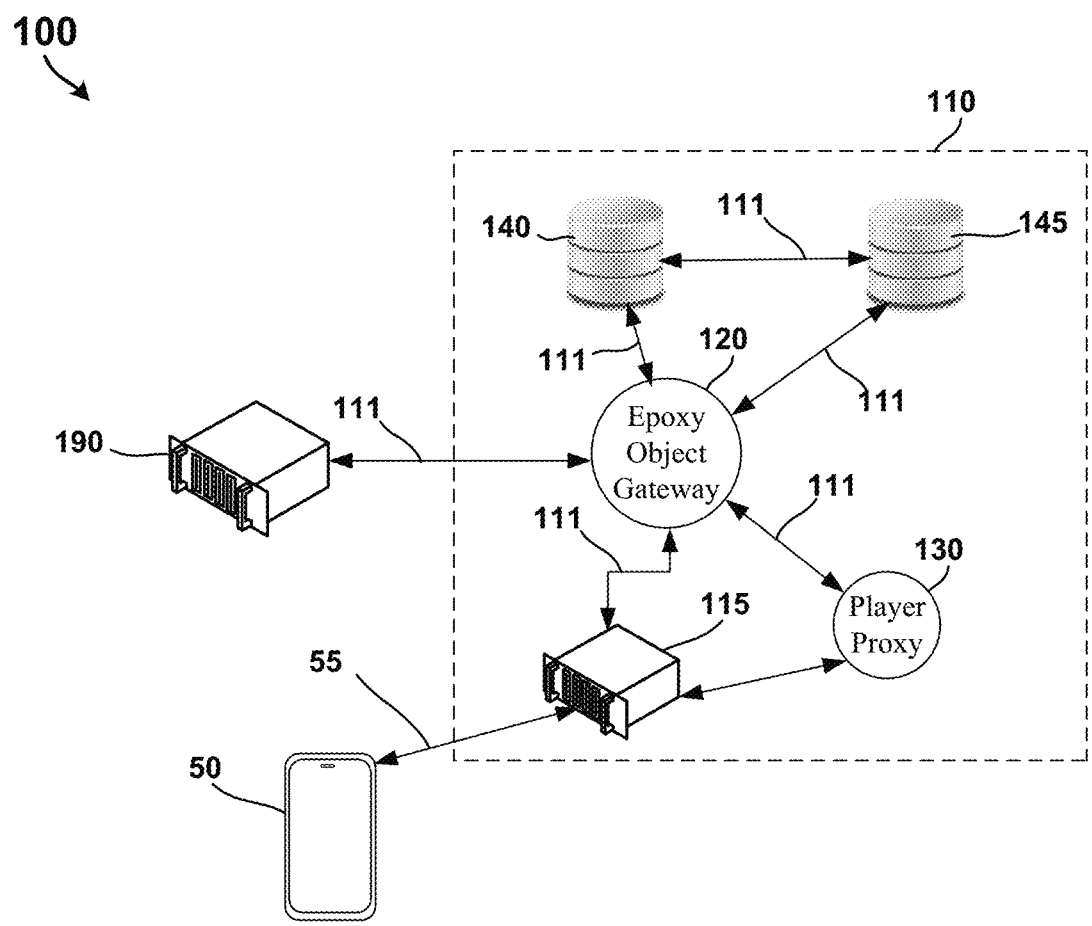
FIG. 1 is a schematic diagram conceptually illustrating a system for deploying live media content as a time-shifted playback in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, systems, and devices for a content delivery network (CDN) computing device to deploy live media content as a time-shifted playback. Embodiment methods may include receiving, from a client computing device, an initial content request for time-shifted playback of live media content. The time-shifted playback of the live media content may be a unique copy of a first live media content configured for playback associated with the initial content request. The initial content request may indicate a past point in time in the first live media content from which the time-shifted playback of the live media content originates. Embodiment methods may further include enabling the client computing device to access an assigned private path for accessing segments of the time-shifted playback of the live media content starting from a requested segment that corresponds to the indicated past point in time. The client computing device may continue accessing subsequent segments of the time-shifted playback of live media content, as long as the client computing device does not tune away from the time-shifted playback (i.e., transmit a subsequent content request for playback of another live media content). Embodiment methods may further include determining whether a subsequent content request for playback of a second live media content is received and preventing access by the client computing device to further segments of the time-shifted playback of the live media content in response to determining that the subsequent content request for playback of the second live media content is received.

Various embodiments may include a CDN that uses a gateway computing device, referred to herein as an "epoxy object gateway," that may be configured to retrieve point-in-time data objects along with associated idempotent data models. The CDN may make large number of individual customer recordings of live media content with little overhead beyond that of a single recording. The epoxy object gateway may use application-defined metadata that enables a time shift buffer (TSB) application to perform a cipher (e.g., xor cipher) on adaptive bitrate (ABR) content, thus generating and storing an incomplete copy of the live media content, as well as a key that includes completion data that may later enable a time-shifted playback of the live media content. The incomplete copy of the live media content may be unique to the individual customer request of that live media content. Like an epoxy resin that joins physical objects, the epoxy object gateway may metaphorically operate virtually to join the incomplete copy of the live media content with the completion data for providing customer access to a time-shifted playback of the originally live media content.

To reduce load on databases and object servers, the TSB application may use a special media container configured to hold all the data objects associated with a particular live media content (e.g., all digital rights management formats and profiles), divided into numerous buckets each of which may be associated with a short period of time. Each bucket may be addressable by a past point in time from which the content of the bucket originated (i.e., when the segment associated with bucket originally aired). When a customer requests content for a time-shifted playback, that customer may use a provided address (i.e., a path) to indicate which content is requested and from which point in time the time-shifted playback should begin. The system may use the request to calculate the correct bucket associated with the live media content and the correct point in time from which to start the playback.

Various embodiments include methods, systems, and devices for reducing the duplication of live media content stored by a CDN computing device for later deployment as a time-shifted playback. Embodiment methods may include receiving the initial content request as described above. In addition, embodiment methods may include creating a record of the initial content request such that the record may include completion data for object files corresponding to segments of live media content stored separately from the record. The completion data may enable playback of a time-shifted playback of the live media content. The completion data may be unique to the initial content request. Embodiment methods may also compile the time-shifted playback of the live media content from object files received from an object store and the completion data received from a metadata database. The compiled time-shifted playback of the live media content may be unique to the initial content request as compared to compilations for other content requests. Embodiment methods may further include assigning a private path for the client computing device to access the compiled time-shifted playback of the live media content. Embodiment methods may further include enabling the private path may enable the client computing device to access segments of the compiled time-shifted playback of the live media content.

Various embodiments may include a CDN computing device, such as a content router configured to run an application that performs real-time digest calculations on new media content objects to calculate a raw content digest value. The CDN computing device may use direct URL storage of raw content data into one or more object stores using the calculated raw content digest value as the object name Meanwhile, the CDN computing device may store metadata into a metadata database, linking the URL digest to the media content objects stored in the one or more object stores. The metadata may contain the original URL, the calculated digest values, a timestamp, object size, expiration time (if any), and any other metadata provided by the application creating the object, such as the content-type. Two notable benefits to storing the raw content data based on the content hash is: a) an effective real-time data de-duplication, and b) when reading back the data, the same digest calculations may be performed to check for corruption. The application may be configured to pre-compute the hash to provide the hash at object creation, thus allowing the application to control which digest algorithm(s) are used. For object retrieval the request may include a specially formatted URL or header containing a timestamp or offset to retrieve the object corresponding to the timestamp (e.g., matching the named object which was created up to and including the requested timestamp).

As used herein, the term "video content" refers to information and expressions thereof that are expressed through a visual display medium or multimedia, including but not limited to video recordings or streaming services broadcast or otherwise transmitted to end-users and/or consumers. As used herein, the term "live media content" refers to video content that is transmitted for display at the same time the images in the video content are occurring (i.e., a live production). Video content may include multimedia content, a video from a video-sharing website/service or social network, podcasts, news, music, or a television program, show, series, etc., that is provided by a programmer (e.g., Turner Broadcasting®, ESPN®, Disney®, Viacom®, etc.) to a content delivery network (e.g., Charter®, Comcast®, DirecTV®, Sling® TV etc.) for Internet Protocol (IP) streaming (e.g., adaptive bit rate (ABR) streaming, such as Apple Hypertext Transfer Protocol (HTTP) Live Streaming (Apple HLS), Dynamic Adaptive HTTP (DASH), etc., or any other type IP streaming) on a channel provided by the content delivery network and associated with that programmer Programmers (e.g., Turner Broadcasting, ESPN, etc.) may encode (e.g., using metadata) and package video content for delivery by the content delivery networks to consumers (also referred to as customers or viewers) via IP streaming services offered by the content delivery networks (e.g., Charter®, Comcast®, DirecTV®, Sling® TV etc.). Through the consumer's computing device, a consumer (also referred to as a customer, viewer, or user) may select video content offered by the consumer's respective content delivery network (i.e., the content delivery network providing service to the consumer's computing device) to output (i.e., play, view, consumed) the video content provided by the programmer Such selected video content is referred to herein as "primary video content." In addition, from time to time, the primary video content may be interrupted and/or followed by what is herein referred to as "secondary video content," which is not directly related to the primary video content. For example, the secondary video content may include advertisements, promotional videos, and other video content not directly selected by the target customer.

As used herein, the term "time-shifted playback" refers to the playback at a client computing device of media content, such as live media content, later than originally aired by a content provider or distributor. By selecting a past point in time associated with a particular live media content, the client computing device may present the time-shifted playback for viewing much later than originally intended.

As used herein, the term "computing device" refers to an electronic device equipped with at least a processor, communication systems, and memory configured to initiate the deployment of live media content as a time-shifted playback and/or reduce the duplication of live media content stored by a computing device for later deployment as a time-shifted playback. Computing devices may include, but are not limited to, any one or all of personal computers, portable computing devices, rack mounted computers, routers, mobile devices, cellular telephones, smart phones, smart watches, smart buttons, smart appliances, personal or mobile multi-media players, personal data assistants (PDAs), tablet computers, smart books, palm-top computers, desk-top computers, wireless electronic mail receivers, cellular telephones, wireless gaming controllers, streaming media players (such as, ROKU®), smart televisions, DVRs, modems, satellite or cable set top boxes, smart remote control devices (i.e., television remote controls with sufficient processing capabilities), and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

FIG. 1 illustrates an example of a live media content deployment environment 100 in accordance with various embodiments. The live media content deployment environment 100 may be configured to deploy live media content in real time. In addition, the live media content deployment environment 100 may also be configured to deploy live media content as a time-shifted playback. In various embodiments, the live media content deployment environment 100 may include various computing devices including a client computing device 50, a content delivery network (CDN) 110, and a content packager 190. The content packager 190 may function as an origin server. The CDN 110 may include an epoxy object gateway 120, a player proxy 130, an object store 140, a metadata database 145, and other computing devices and components such as an edge server 115. The epoxy object gateway 120, player proxy 130, object store 140, and metadata database 145 are illustrated as being part of the CDN 110, however any one or more of those computing devices may be separate from the CDN 110.

The client computing device 50 may be any electronic device equipped with at least a processor, communication systems, and memory configured to display and/or otherwise present media content. The client computing device 50 may be any electronic device equipped with at least a processor, communication systems, memory, and a display or audio system for playing live or time-shifted video content. The client computing device 50 may be coupled to the CDN 110 through one or more connections 55 to an edge server 115. The one or more connections 55 may include a long-range wireless connection and one or more wired connections. Alternatively, or additionally, the client computing device 50 may be coupled to the CDN 110 by a short-range wireless connection (e.g., Wi-Fi, Bluetooth, etc.) to a wireless router, which may then couple the client computing device 50 to the CDN 110 by way of one or more additional wired and/or wireless connections.

The CDN 110 may be part of an IP network with various interconnected computing devices. In addition to the edge server 115, epoxy object gateway 120, player proxy 130, object store 140, and metadata database 145, the CDN 110 may additionally include a cache that acts as an intermediary to the origin server (e.g., between the content packager 190 and the epoxy object gateway 120), manifest manipulator server (not shown), alternate content server (not shown), programmer server (not shown), and/or guide vendor server (not shown). The edge server 115 may be configured to deliver streaming media content to the client computing device 50 from a session specific URL. The edge server 115 may direct the client computing device 50 to the epoxy object gateway 120, the player proxy 130, and/or other components (e.g., an origin server) as needed. When the client computing device 50 request a live video content, the edge server 115 may direct the client computing device 50 to the origin server. In contrast, when the client computing device 50 requests a time-shifted playback of live video content, the edge server 115 may direct the client computing device 50 to the player proxy 130.

The CDN 110 may be connected to the various servers and other computing devices via one or more wired and/or wireless connections, such as connections to wired and/or wireless networks (e.g., connections to the Internet), and via those connections may exchange data. Via the connections (wired and/or wireless) with one another, the various servers and other computing devices may exchange data with one another. The CDN 110 may be operated by a content distributor (e.g., Charter®, Comcast®, DirecTV®, Sling® TV etc.) and may provide video content, such as live video content or other television services via IP streaming (e.g., ABR streaming, such as Apple HLS, DASH, etc., or any other type of IP streaming) to consumers, such as one using the client computing device 50.

The edge server 115 may be a computing device configured to process and respond to incoming internet requests from internet clients (e.g., the client computing device 50 connected to the edge server 115 via the Internet). The edge server 115 may be a computer running one or more programs that are designed to listen for and process incoming internet requests (e.g., from the client computing device 50). The edge server 115 may take on all the responsibility of serving up the content for an internet property such as a website, provided that the traffic does not extend beyond what the server is capable of processing and latency is not a primary concern.

The epoxy object gateway 120 may be a computing device configured to operate as a portal and go-between, brokering transactions between a client computing device 50 and another remote computing device, such the player proxy 130, object store 140, metadata database 145, and/or content packager 190. The epoxy object gateway 120 may be the single point of access for content to the client computing device 50 and may allow remote servers to reside on a private network or behind a firewall. In order to support time-shifted playback, the epoxy object gateway 120 may store copies of at least part of requested ABR content (i.e., the live media content) along with associated idempotent data models.

To store copies of the live media content, the epoxy object gateway 120 may perform a deduplication process that divides each package received from the packager 190 into objects. Each of the objects may be associated with a short period of time (e.g., 20 seconds) from when the content was published (i.e., a past point in time) and one or more idempotent data models (i.e., completion data). Each object may be addressable by its respective point in time, uploaded to the object store 140, and thus associated with a particular path (e.g., a URL) for retrieving the object from the object store 140. In this regard, the objects stored in the object store 140 may represent an incomplete copy of that short period of time of live media content. In addition, the epoxy object gateway 120 may generate idempotent data models. The idempotent data models may be stored in the metadata database 145. The idempotent data models may provide completion data that may be used to deliver complete copies of the live media content as a time-shifted playback once rejoined with the objects stored in the object store 140. The epoxy object gateway 120 may perform a cipher (e.g., xor cipher) on the live media content. Thus, the epoxy object gateway 120 may generate the incomplete copy of the live media content for storing in the object store 140. In addition, the epoxy object gateway 120 may generate a key that includes completion data that may be stored in the metadata database 145. The completion data for each client session of requested time-shifted playback may be unique to the individual customer request of that live media content. The epoxy object gateway 120 may operate virtually to join the objects stored at the object store 140 with the completion data stored in the metadata database 145 for providing a requesting client computing device 50 with access to a time-shifted playback of the originally live media content.

The player proxy 130 may be an application (e.g., running virtually on another computing device) and/or a separate computing device that acts as an intermediary for requests from clients (e.g., the client computing device 50) seeking to download a time-shifted playback of live media content. The player proxy 130 may handle updates to the metadata database 145 for tracking from which source each session is streaming. The player proxy 130 may also associate content requests received by the CDN 110 with the correct source object (e.g., from the object store) and completion data (e.g., from the metadata database 145). The player proxy 130 may proxy (i.e., serve as a URL end-point for) the content data or provide a URL redirect (e.g., 302 message) for the CDN 110 to directly serve from an origin server or the epoxy object gateway 120. In this way, the player proxy 130 may provide an additional level of abstraction and control to ensure the smooth flow of video content between client computing device(s) 50, the CDN 110, and the various other computing devices. In addition, the player proxy 130 may be configured to keep track of which object(s) may be downloaded and/or running; determine how to route requests from the client computing device 50 to interact with the CDN 110; and route the epoxy object gateway 120 to the correct buffer location and database.

The object store 140 may be a remote computing device, such as one or more servers, configured to operate as a computer that stores data, such as a database, and manages the data as objects. The object store 140 may store a large volume of objects, such as segments of live media content.

The metadata database 145 may be a remote computing device, such as a server, configured to organize one or more collections of data stored and accessed electronically. The metadata database 145 may store hashing content provided by an origin server, the epoxy object gateway 120, and/or the player proxy 130. The metadata database 145 may also store completion data for playback of content maintained by the object store 140. The edge server 115 and/or the player proxy 130 may create unique object entries. The unique object entries may include an encryption key and completion data for storage in the metadata database 145. The unique object entries may be unique to each source and for each session indicated by the player proxy 130 as content that may be submitted.

The content packager 190 (also known as a segmenter or fragmentor) may be a computing device configured to create packages (i.e., segmented video files) that may be delivered over HTTP to clients. For example, the packages may each contain about 20 seconds of video, but a series of packages that are part of the same video stream may be stitched back together to form a contiguous video stream. In this way, the content packager 190 may send a contiguous video stream, which is made up of a series of packages, to the CDN 110 (e.g., an origin server) for processing.

The communication links 111 between components of the CDN 110 and content packager 190 may use any of variety of wireless (e.g., 5g-NR(u), LTE, Citizens Broadband Radio Service (CBRS), etc.) and/or wired networks (e.g., Ethernet, TV cable, telephony, fiber optic and other forms of physical network connections) that may use one or more communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Each of the various computing devices including the client computing device 50, the edge server 115, the epoxy object gateway 120, the player proxy 130, the object store 140, the metadata database 145, and the content packager 190 may include electronic storage. The electronic storage may comprise non-transitory storage media that electronically stores information. The non-transitory storage media of the electronic storage may include one or both of system storage that is provided integrally (i.e., substantially non-removable) and/or removable storage that is removably connectable thereto via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from the computing devices housing the electronic storage, as well as information received from other computing device(s), external resources and/or other information that enables the respective computing device to function as described herein.

In embodiments in which a video stream (i.e., live media content) is setup, the packager 190 may also create a manifest for delivery to numerous computing devices, like the client computing device 50. The manifest is a file that informs the client computing device 50 various parameters associated with a video stream. For example, the manifest may include information related to the possible resolutions and bitrates that may be available for a selected video stream so that the client computing device 50 may select an appropriate stream. Upon selection of a particular live media content, the client computing device 50 may receive the manifest (via the CDN 110), make an appropriate stream selection, and begin downloading the video stream. In embodiments in which the network conditions change in the middle of the live stream—the client computing device 50 may use the manifest to modify the video stream version that may be downloaded to ensure that a version of the video stream continues to download. Having made a live media content selection, the client computing device 50 may repeatedly (e.g., every 2 seconds) transmit a request to obtain a new (i.e., updated) manifest. Each new manifest may use the same file name but may be associated with a package containing the most recent 20 seconds of video. In this way, the view of client computing device 50 of the live video content may be limited to the duration of the package (e.g., 20 seconds), after which a new package may be received and stitched together with the previous packages (i.e., 20 second packages) of video to continue viewing and provide a contiguous video stream of the program content.

To support deployment of live media content as a time-shifted playback, various embodiments may use the object store 140 and the metadata database 145 together as a buffer to store unique copies of one or more live video streams (i.e., the live media content) as they are published by the packager 190. In response to the client computing device 50 tuning to a channel (e.g., CNN, ESPN, etc.), using an application (i.e., an App), the client computing device 50 may send an initial content request to the CDN 110. In response to receiving the initial content request, the CDN 110 may use the epoxy object gateway 120 and the player proxy 130 to ensure either a copy of the live video stream is already being made (e.g., for another client that tuned-in earlier) or otherwise start the process of making a copy. In addition, the epoxy object gateway 120 may send to the client computing device 50 a URL for accessing the live media content. Various embodiments copy the live media content as soon as the client computing device 50 tunes to a channel in order to subsequently provide the client computing device 50 with a time-shifted playback if the pause or rewind functions are used. Alternatively, the epoxy object gateway 120 may not start making a copy of the live media content or have the player proxy 130 check whether a copy is already being made until the client computing device 50 requests a time-shifted playback (e.g., following the first use of the pause function). This alternative would not initially provide the rewind function unless a copy of the live media content was already being made (e.g., for another client). Also, later use of the rewind function would similarly be limited to the time during the live media content that the client computing device 50 made the initial content request for the time-shifted playback unless a copy of the live media content was already being made.

After selecting a desired live media content, the client may decide to use the pause, rewind, and/or fast-forward functions, although the furthest a client can fast-forward is to the currently published video content (i.e., the live stream). Activating the pause, rewind, or fast-forward functions using the App on the client computing device 50 may be configured to send a content request for a time-shifted playback of live media content to the epoxy object gateway 120. The content request may include a temporal value that indicates a past point in time in the live media content from which the time-shifted playback of the live media content originates and from which the client computing device 50 desires the playback to begin. For example, in embodiments in which the client computing device 50 rewinds to a point in the live media content that was originally published 5 minutes ago, then the content request may provide a temporal value that identifies the point 5 minutes ago in the live media content. Similarly, in embodiments in which the client computing device 50 selects the play function after using the pause function (i.e., resumes play), the content request may provide a temporal value that identifies how long the pause function was maintained (e.g., a number of seconds in the past or a point in time relative to the start or end of the live video stream). Further, in embodiments in which the client computing device 50 the fast-forward function after using the pause or rewind functions, the content request may provide an appropriate temporal value indicating what point in the media content that the client computing device 50 desires to commence or recommence viewing.

The first time a client computing device 50 sends a request for a time-shifted playback associated with a particular live media content, that request may be referred to as an "initial content request for a time-shifted playback of live media content." In response to receiving, from the client computing device 50, an initial content request for a time-shifted playback of live media content, the epoxy object gateway 120 may assign a session ID (e.g., a random string of digits) and initiate the player proxy 130. The player proxy 130 may determine whether a copy of the first live media content is being or has already been made. If a prior content request was received for playback of the same live media content from the subject client computing device or another, the player proxy 130 may have a record of the same live media content previously being requested. Thus, if a copy of the first live media content is being or has already been made, the player proxy 130 may provide the client computing device 50 with a private URL (i.e., a unique retrieval path) and session ID for downloading a time-shifted playback of the live media content. If the player proxy 130 determines that a copy of the first live media content is not being or has not already been made, the player proxy 130 may signal the epoxy object gateway 120 to store a copy of the first live media content for a time-shifted playback. The epoxy object gateway 120 may thus perform a deduplication process that generates object files and completion data corresponding to the packets received from the packager 190. Once the object files and completion data are generated, the epoxy object gateway 120 may send the object files to the object store 140 and the and completion data to the metadata database 145 for storing.

The CDN 110 may provide the client computing device 50 with the private URL assigned to the session ID for time-shifted playback of the live media content. Using the provided path and the assigned session ID, the client computing device 50 may send one or more content requests for time-shifted playback of the live media content. Such content requests may include a temporal value that identifies a past point in time in the live media content from which the time-shifted playback originates and should begin. The CDN 110 may receive such a content request and pass the content request along to the epoxy object gateway 120. The epoxy object gateway 120 may then convert content request into one or more time stamps covering the requested period (e.g., 302 seconds of past video). Using tracking information maintained and provided by the player proxy 130, the epoxy object gateway 120 may then download the files and/or data corresponding to those time stamps from the object store 140 and the metadata database 145 for downloading the appropriate time-shifted playback to the client computing device 50. If the client continues watching beyond the initially requested period, the epoxy object gateway 120 will continue to provide the subsequent periods (i.e., subsequent packages) from the same copy of the media content. In this manner, the client computing device 50 may be given the impression that the client computing device 50 is downloading or watching the media content in real time.

After the client computing device 50 starts downloading the time-shifted playback, in instances in which the client computing device 50 tunes away from the currently tuned channel to another channel, which generates a new initial content request, the CDN 110 will provide the client computing device 50 with another URL with a new session ID that is used to deliver the new media content of the newly tuned channel Once the client computing device 50 uses the new URL, the old buffer at the object store 140 and/or the metadata database 145 may be deleted. In some embodiments, the associated information stored in the metadata database 145 (e.g., completion data) may be deleted first. Without the associated information in the metadata database 145, time-shifted playback may not occur. If the client computing device 50 stops watching, for whatever reason (e.g., they lose power or otherwise turn off the viewer), as long as the client computing device 50 does not tune to a different channel, the old URL may still be available. Thus, the client computing device 50 may continue to download the time-shifted playback to watch the original media stream still stored in the buffer. To continue making the time-shifted playback available for some time, the associated information in the metadata database 145 may be maintained for a brief period (e.g., 2 minutes) after the client computing device 50 stops requesting subsequent segments of the time-shifted playback. Alternatively, the back-office may assign the URL and send it again to the client device if they log-back on within a short time period (e.g., 5 minutes).

The CDN 110 may cache the original copy of the live media content (in 2-minute intervals), but the player proxy 130 may control or direct the reassembly of a unique media content copy for the CDN 110 to cache. An HTTP transport is not considered by some jurisdictions to be a broadcast or a performance, which means if it is a unique delivery, it should not violate copyright laws. Thus, the CDN 110 may cache and reconstitute the unique version of the media content without violating copyright restrictions, but the media content may need to be user-requested and the copy (i.e., in the cache) has to be unique. There may be multiple epoxy object gateways 120 running simultaneously and multiple player proxies 130 running to reconstitute live media content for different client computing devices 50.

Various embodiments may comply with legal requirements that call for only a unique copy of live media content to be saved per user request. The unique copy of the live media content may be generated by changing minor parts (e.g., some random bits may be left out) in each version of the media content delivered to the client computing device 50. Since each version of the media content is uniquely written it is, in effect, a unique copy of the live media content and may be stored and delivered to an individual client while still complying with such legal requirements. Different clients may receive different unique copies, even though the bulk of the live media content may be stored only once.

Figure 2A:
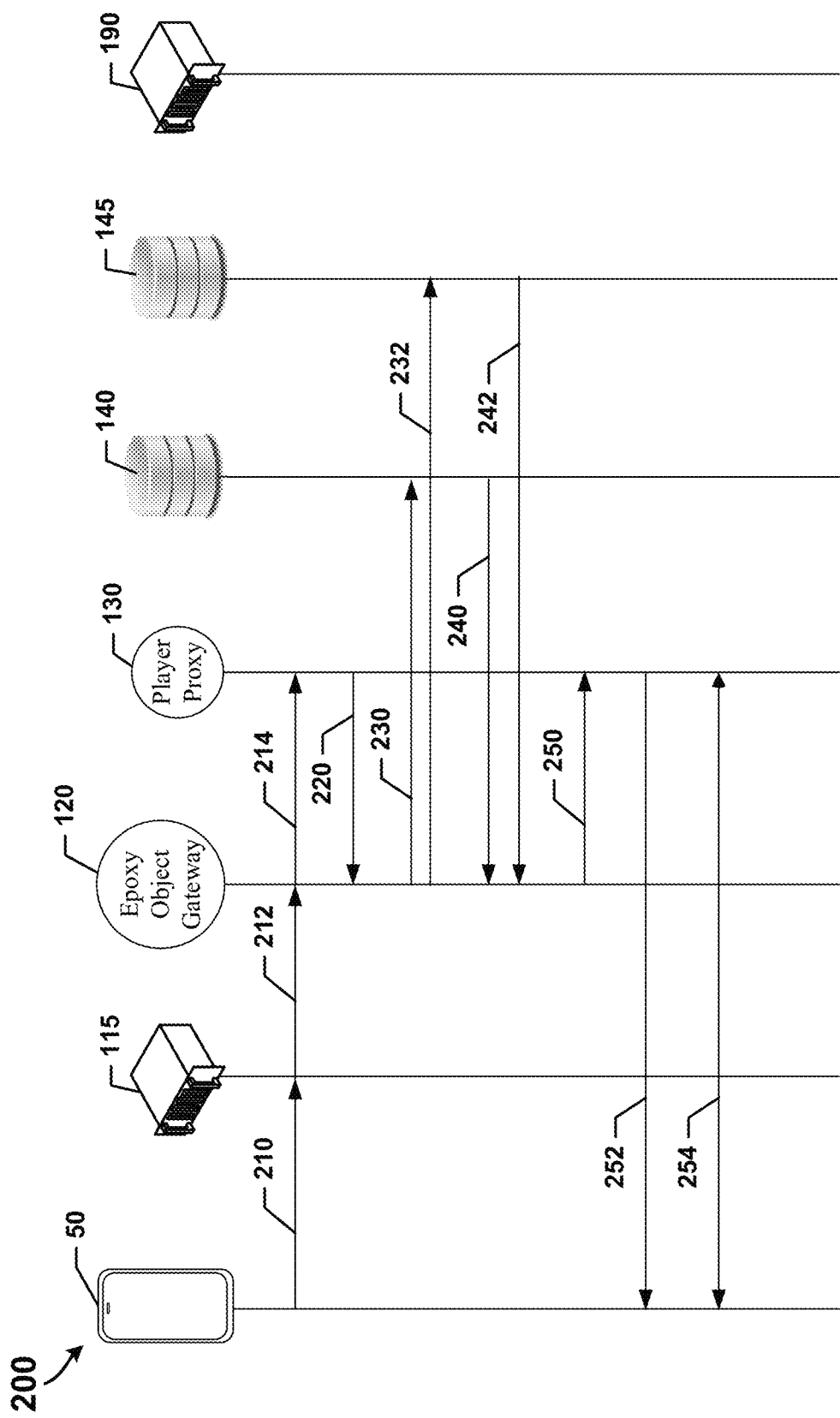
FIGS. 2A and 2B illustrate example communication flow diagrams of a live media content deployment as a time-shifted playback in accordance with various embodiments.
Figure 2B:
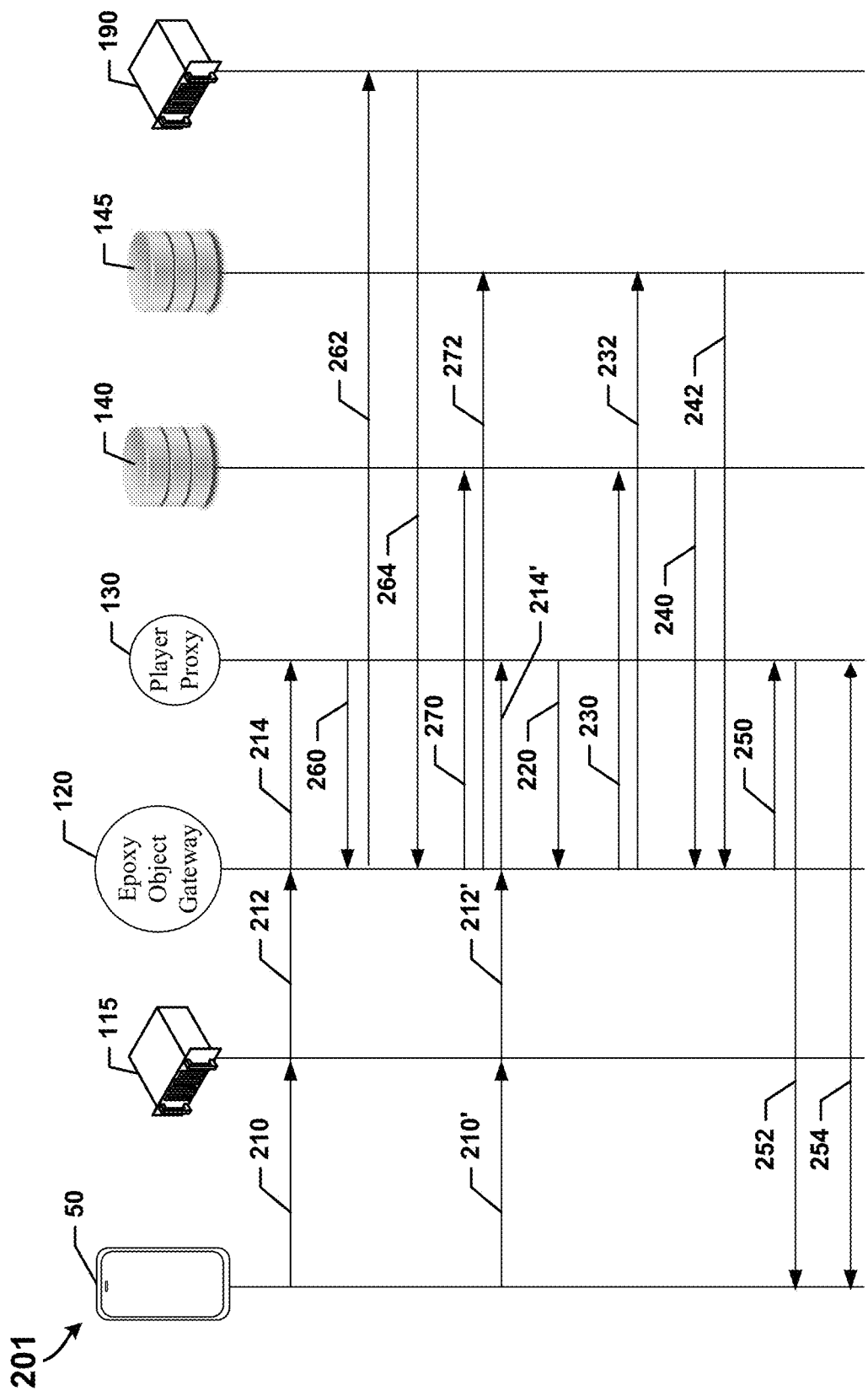

FIGS. 2A and 2B illustrate example communication flow diagrams 200, 201 for deployment of live media content as a time-shifted playback to a client computing device 50 in accordance with various embodiments. Initially, the CDN (e.g., 110 in FIG. 1) may determine whether a copy of the same media content identified by the initial content request 210 is already being stored by the CDN (e.g., from an earlier content request either by the same client computing device or another client computing device. If a copy of the same media content identified by the initial content request 210 is already being stored by the CDN, then the CDN may already have the object files and additional information needed to reconstruct and make available a time-shifted copy of the subject live media content stored in a buffer. If a copy of the same media content identified by the initial content request 210 is not already being stored by the CDN, then the CDN may first obtain the content from the packager 190 before making the time-shifted copy of the subject live media content available to the client computing device 50.

FIG. 2A illustrates a communication flow diagram 200 in which a determination was made that a prior content request was received for playback of the same live media content requested by an initial content request of the client computing device 50. With reference to FIGS. 1-2A, in various embodiments, the operations of the communication flow diagram 200 may be performed between the client computing device 50, the edge server 115, the epoxy object gateway 120, the player proxy 130, the object store 140, and the metadata database 145.

Before the CDN initiates the deployment of live media content as a time-shifted playback, a client using the client computing device 50 may send an initial content request 210 for a time-shifted playback of live media content to the CDN at an edge server 115. For example, a client may tune the client computing device 50 to a channel or live broadcast (i.e., a live media content), not having previously tuned-in to that live content stream, which sends the initial content request 210 for the live media content associated with the tuned to channel to the edge server 115. The initial content request 210 may be received by the edge server 115, which may in-turn send a pass-along content request 212 to the epoxy object gateway 120, which may be the same or similar to the initial content request 210. In response to receiving the pass-along content request 212, the epoxy object gateway 120 may assign a session ID associated exclusively with the initial content request 210 and the requesting client computing device 50. In addition, the epoxy object gateway 120 may then initiate the player proxy 130 by sending a prior copy inquiry 214 to the player proxy 130. The prior copy inquiry 214 may be the same or similar to the initial content request 210 and/or the pass-along content request 212. The prior copy inquiry 214 may be used by the player proxy 130 to determine whether a copy of the same media content identified by the initial content request 210 is already being stored by the CDN 110. In the example associated with communication flow diagram 200, the player proxy 130 determines that a copy of the same media content identified by the initial content request 210 is already being stored by the CDN 110 (e.g., from a prior content request of the same client computing device 50 or a different client computing device 50). Thus, the epoxy object gateway 120 need not request and store packages associated with the requested media content from the packager 190 as such packages are already being stored in response to the prior request.

In response to determining that a copy of the same media content identified by the initial content request 210 is already being stored by the CDN 110, the player proxy 130 may transmit a media content reassembly request 220 to the epoxy object gateway 120. The player proxy 130 may track which source maintains a copy of media content, including the temporal information related to when, in the live media content, the client wants playback to resume, as well as any time-shifted playback progress associated with a particular session ID. In this way, the content reassembly request 220 may identify a source and temporal information for downloading the right source object and metadata.

The media content reassembly request 220 may trigger the epoxy object gateway 120 to download and reassemble (i.e., bind) a unique copy of the live media content from two parts. One part includes object files containing incomplete copies of the requested live media content, while another part includes metadata containing a session key and completion data that enables the time-shifted playback of the live media content.

To reassemble the media content and provide a time-shifted playback, the epoxy object gateway 120 may send an object request 230 to the object store 140. The object request 230 may identify or provide information for determining a past point in time in a buffer copy of a particular live media content from which the time-shifted playback of the live media content should begin. In addition, the epoxy object gateway 120 may send a metadata request 232 to the metadata database 145. The metadata request 232 may identify or provide information for determining appropriate metadata, including completion data (e.g., unique bytes), for a particular live media content from which the time-shifted playback of the live media content should begin. In response to the object request 230 and the metadata request 232, the object store 140 and the metadata database 145 may transmit the corresponding object files 240 and completion data 242, respectively to the epoxy object gateway 120. The epoxy object gateway 120 may then rejoin pairs of both parts received (e.g., 240, 242) to provide access to a reassembled and unique copy of the previously live media content in the form of a time-shifted playback 250, which is forwarded to the player proxy 130. Thus, the epoxy object gateway 120 acts like an epoxy hardener that binds the two parts, which otherwise are unusable on their own. The epoxy object gateway 120 may then send a client-copy time-shifted playback 252 to the client computing device 50. The client-copy time-shifted playback 252 may be the same or similar to the time-shifted playback 250 generated by the epoxy object gateway 120. Thereafter, the player proxy 130 may serve as a URL endpoint, with further communications 254 between the client computing device 50 and the player proxy 130 (via the edge server 115) including subsequent content requests from the client computing device 50 and delivering follow-on segments of time-shifted playback either directly from the player proxy 130 or as a proxy for the segments of time-shifted playback from a remote URL.

FIG. 2B illustrates a communication flow diagram 201 in which a determination was made that a prior content request was not received for playback of the same live media content requested by an initial content request of the client computing device 50. With reference to FIGS. 1-2B, in various embodiments, the operations of the communication flow diagram 201 may be performed between the client computing device 50, the edge server 115, the epoxy object gateway 120, the player proxy 130, the object store 140, the metadata database 145, and the packager 190. In FIG. 2B, the initial content request 210, pass-along content request 212, prior copy inquiry 214, object request 230, metadata request 232, object files 240, completion data 242, time-shifted playback 250, client-copy time-shifted playback 252, and the further communications 254 may be similar to those described above with regard to FIG. 2A and the communication flow diagram 200.

In the example associated with communication flow diagram 201, the player proxy 130 determined that a copy of the same media content identified by the initial content request 210 is not already being stored by the CDN 110. Thus, after the player proxy 130 verifies that a copy of the same media content identified by the initial content request 210 is not already being stored, the player proxy 130 may instruct the epoxy object gateway 120 to access, request, and/or retrieve a copy of the live media content from the packager 190. In this way, the player proxy 130 may send a media content copy request 260 to the epoxy object gateway 120. The media content copy request 260 may include an update for a database of the epoxy object gateway that keeps track of what client has tuned in to what live media content (i.e., client ID and channel selection). In response thereto, the epoxy object gateway 120 may transmit a media download request 262 to the packager 190, which in-turn will transmit the live media content 264 as a consecutive stream of packages to the epoxy object gateway 120.

As each of the packages of the live media content 264 is received by the epoxy object gateway 120, the epoxy object gateway 120 may generate object files 270 and metadata with completion data 272 corresponding to each packet received from the packager 190. Once the object files 270 and metadata with completion data 272 are generated, the epoxy object gateway 120 may send the object files 270 to the object store 140 and the metadata with completion data 272 to the metadata database 145 for storing. From this point forward, any subsequent prior copy inquiries (e.g., 214') may determine that a copy of the same media content identified by the initial content request 210 is already being stored (see e.g., message flow in FIG. 2A).

The subsequent content request 210', subsequent pass-along content request 212', and subsequent prior copy inquiry 214' may be similar to the initial content request 210, prior pass-along content request 212, and prior copy inquiry 214. However, the subsequent content request 210', subsequent pass-along content request 212', and subsequent prior copy inquiry 214' may occur sometime after the client computing device 50 tuned to the channel showing the media content associated with the initial content request 210. It should be noted with regard to the example associated with communication flow diagram 201, since no copy of the same media content identified by the initial content request 210 is already being stored, prior to receipt of the initial content request 210, there may be no ability to rewind at that point in time. Also, fast-forward would not be an option at that point since the media content is caught-up to the live feed. Thus, only the pause function may be available at the time of receipt of the initial content request 210 or the pass-along content request 212 for the example illustrated in communication flow diagram 201. However, after some time has passed, following the receipt of the content requests 210, 212, at the time of the subsequent content request 210', subsequent pass-along content request 212', and subsequent prior copy inquiry 214' the resume play and fast-forward functions may be available. Later, the rewind function may additionally become available, although still limited to the point in time when the content requests 210, 212 were received.

Following the subsequent content requests 210', 212' since a copy of the same media content identified by the initial content request 210 is already being stored the communication flow diagram 201 may continue similar to the communication flow diagram 200 after prior copy inquiry 214 was received by the player proxy.

The processor(s) of the computing devices described herein may be configured to provide information processing capabilities. As such, the processor(s) may include one or more of a digital processor, an analog processor, a digital circuit designed to process information, an analog circuit designed to process information, a state machine, and/or other mechanisms for electronically processing information. The processor(s) may be a single unit or may include a plurality of processing units. The one or more processing units may be physically located within the same device, or one or more of the processor(s) may represent processing functionality of a plurality of devices, remote from one another and operating in coordination.

FIGS. 3A-3F illustrate operations of a methods 300, 301, 302, 303, 304, and 305 that may be implemented for deploying live media content as a time-shifted playback. The operations of the methods 300, 301, 302, 303, 304, and 305 presented below are intended to be illustrative. In some embodiments, the methods 300, 301, 302, 303, 304, and 305 may be accomplished with one or more additional operations not described, and/or without one or more of the operations discussed. Additionally, the order in which the operations of methods 300, 301, 302, 303, 304, and 305 are illustrated in FIGS. 3A, 3B, 3C, 3D, 3E, and/or 3F and described below is not intended to be limiting.

Figure 5:
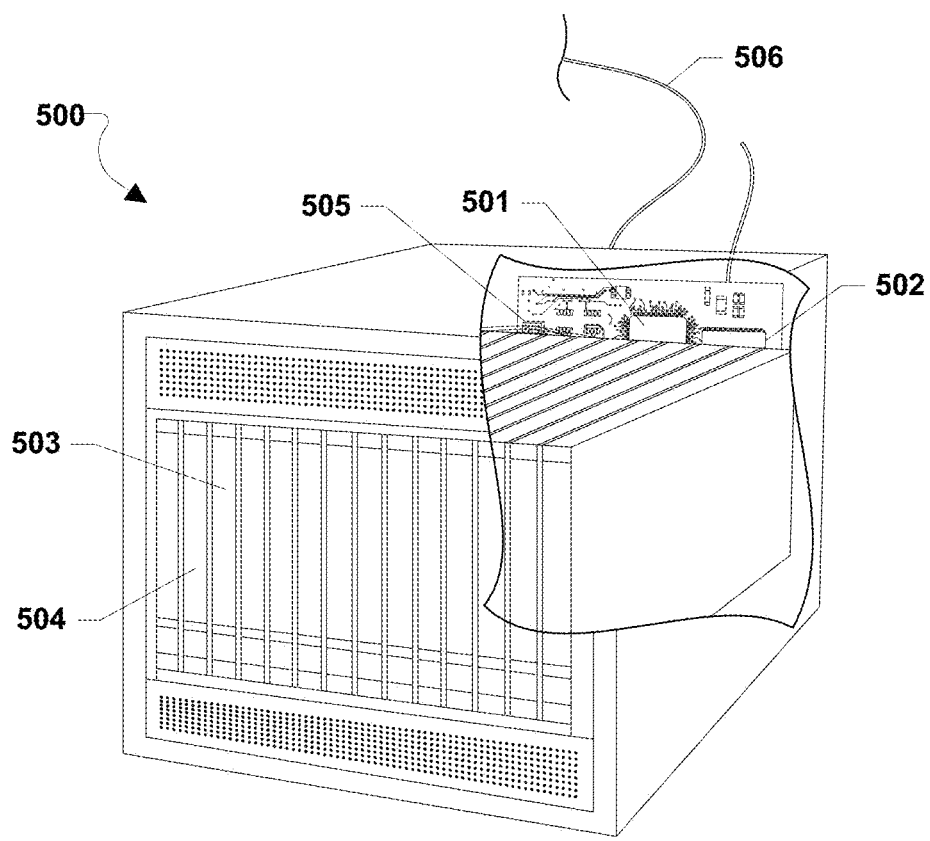
FIG. 5 is a component diagram of an example server suitable for use with the various embodiments.
Figure 6:
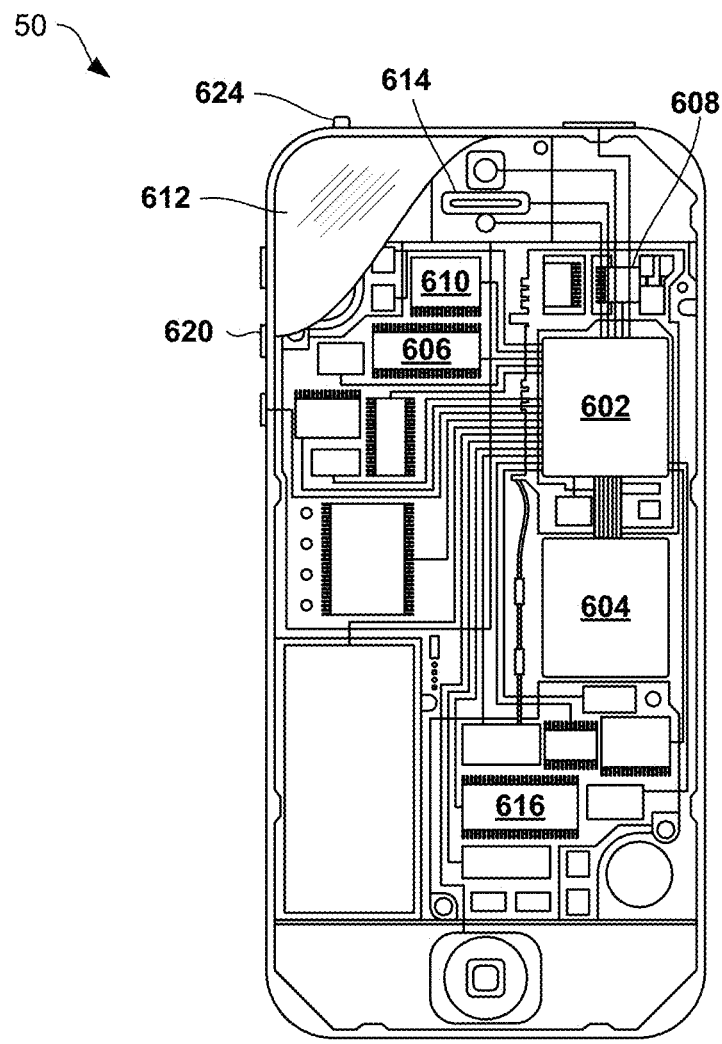
FIG. 6 is a component diagram of an example client computing device suitable for use with various embodiments.

In some embodiments, methods 300, 301, 302, 303, 304, and 305 may be implemented in one or more processors (e.g., 501, 602, and 604 in FIGS. 5 and 6, respectively) in conjunction with memory (e.g., 502 and 606 in FIGS. 5 and 6). The one or more processor(s) may include one or more device(s) executing some or all of the operations of the methods 300, 301, 302, 303, 304, and 305 in response to instructions stored electronically on an electronic storage medium. The one or more processor(s) may include one or more devices configured through hardware, firmware, and/or software to be specifically designed for execution of one or more of the operations of the methods 300, 301, 302, 303, 304, and 305. For example, with reference to FIGS. 1-3F, the operations of the methods 300, 301, 302, 303, 304, and 305 may be performed primarily or entirely by one or more processors in any one or more of a variety of CDN computing devices (e.g., the edge server 115, epoxy object gateway 120, player proxy 130, object store 140, or metadata database 145).

Figure 3A:
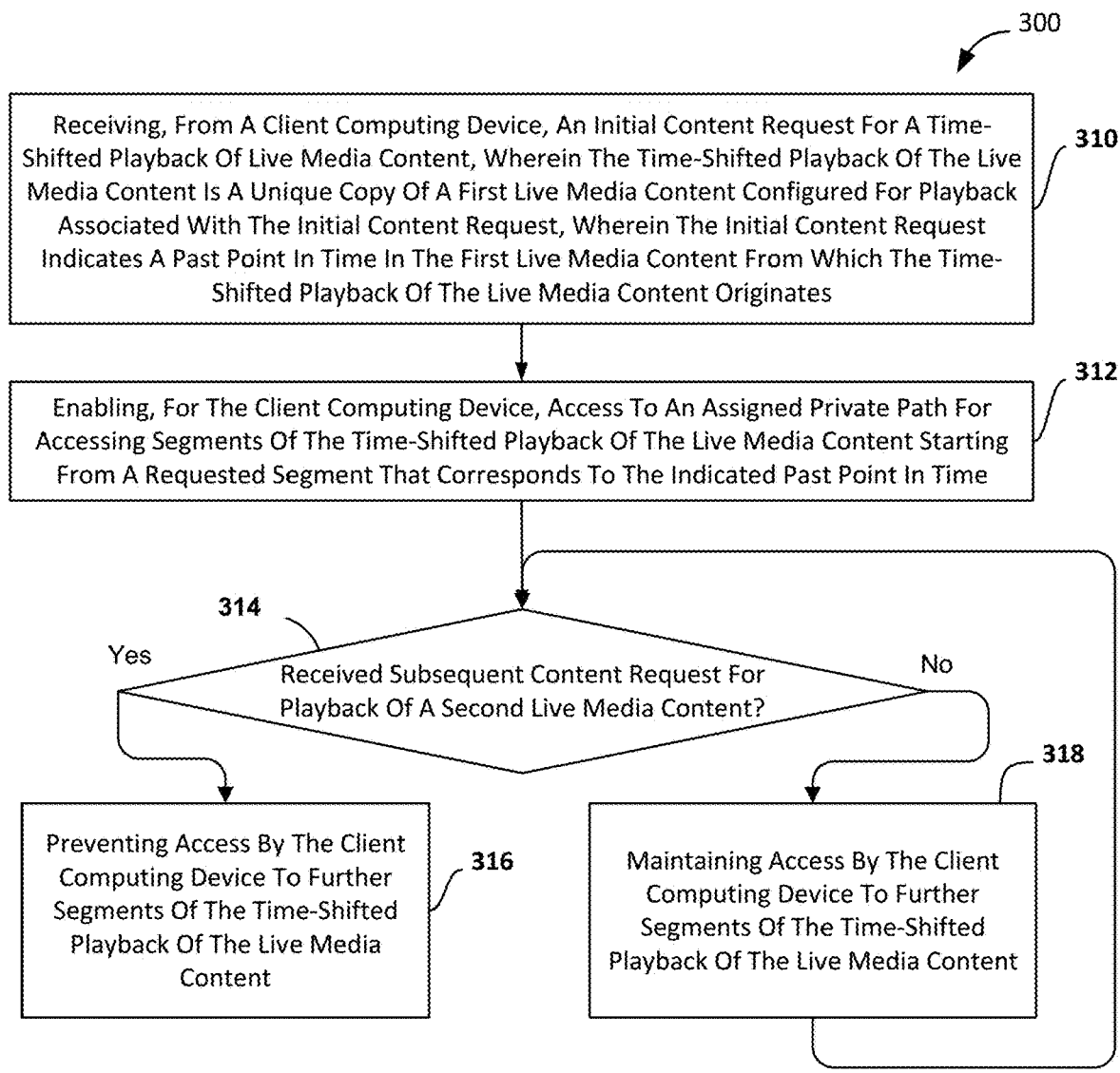
FIGS. 3A-3F are process flow diagrams illustrating embodiment methods for deploying live media content as a time-shifted playback suitable for use with various embodiments.

FIG. 3A illustrates the method 300, in accordance with one or more embodiments. In block 310, the processor may receive, from the client computing device (e.g., 50), an initial content request for a time-shifted playback of live media content. The time-shifted playback of the live media content may use a unique copy of a first live media content configured for playback associated with the initial content request. The initial content request indicates a past point in time in the first live media content from which the time-shifted playback of the live media content originates. In some embodiments, the initial content request may include a time interval that provides the indication of the past point in time of the first live media content from which the playback of the time-shifted playback of the live media content should begin. The initial content request received in block 310 may be received by one or more processors through a transceiver (e.g., 505 and 608 in FIGS. 5 and 6). As a non-limiting example, the processor may receive an initial content request from a client computing device that has just tuned-in to a media content programming channel presenting live media content. Alternatively, the client computing device may have been tuned-in to that channel for some time, but now has transmitted a play command after pausing, rewinding, or fast-forwarding the media content being viewed. The reception in block 310 may be received by one or more processors through a transceiver (e.g., 505 and 608 in FIGS. 5 and 6). In various embodiments, the reception of the initial content request in block 310 may be performed primarily or entirely by one or more processors in any one or more of a variety of CDN computing devices (e.g., the edge server 115, epoxy object gateway 120, player proxy 130, object store 140, or metadata database 145).

In block 312, the processor may enable, for the client computing device 50, access to an assigned private path for accessing segments of the time-shifted playback of the live media content starting from a requested segment that corresponds to the indicated past point in time. As a non-limiting example, the processor may provide the client computing device 50 with a private URL that provides access to a unique copy of the live media content as a time-shifted playback. In various embodiments, the assignment of the private path for accessing segments of the time-shifted playback of the live media content in block 312 may be performed primarily or entirely by one or more processors in any one or more of a variety of CDN computing devices (e.g., the edge server 115, epoxy object gateway 120, player proxy 130, object store 140, or metadata database 145).

In determination block 314, the processor may determine whether a subsequent content request for playback of a second live media content is received. As a non-limiting example, the processor may receive the subsequent content request for playback of the second live media content because the client computing device changed channels or otherwise tuned-away from viewing the live media content associated with the initial content request and its associated session ID. In response to the processor determining that a subsequent content request for playback of a second live media content is received (i.e., determination block 314="Yes"), the processor may prevent access by the client computing device to further segments of the time-shifted playback of the live media content in block 316. Preventing access in this way may allow the system of deploying live media content as a time-shifted playback to comply with laws, rules, and regulations in various jurisdictions (e.g., copyright and/or digital copying laws). In some embodiments, preventing access by the client computing device to further segments of the time-shifted playback of the live media content may include deleting one or more segments of the time-shifted playback of the live media content from a buffer.

In response to the processor determining that a subsequent content request for playback of a second live media content is not received (i.e., determination block 314="No"), the processor may maintain access by the client computing device to further segments of the time-shifted playback of the live media content in block 318. Following the operations in block 318, the processor may again determine whether a subsequent content request for playback of a second live media content is received in determination block 314.

In various embodiments, the determination of whether a subsequent content request for playback was received in block 314 may be performed primarily or entirely by one or more processors in any one or more of a variety of CDN computing devices (e.g., the edge server 115, epoxy object gateway 120, player proxy 130, object store 140, or metadata database 145). Similarly, the prevention of access to further segments of the time-shifted playback in block 316 and/or the maintenance of access to further segments of the time-shifted playback in block 318 may be performed primarily or entirely by one or more processors in any one or more of a variety of CDN computing devices (e.g., the edge server 115, epoxy object gateway 120, player proxy 130, object store 140, or metadata database 145).

In some embodiments, the processor may repeat the operations in determination block 314 and blocks 310, 312, 316, and 318 to periodically or continuously set up and operate a system for deploying live media content as a time-shifted playback.

Figure 3B:
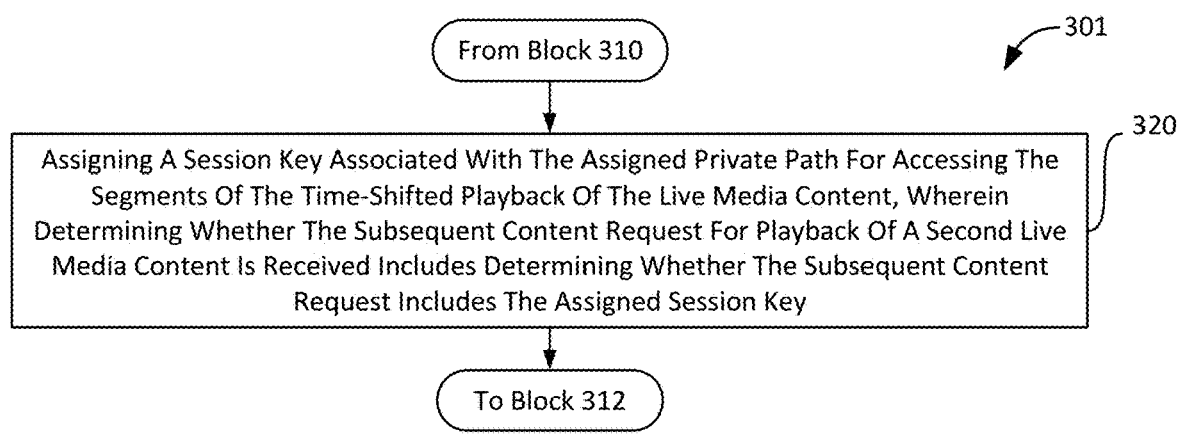

FIG. 3B illustrates the method 301, in accordance with one or more embodiments. In block 320, following the operations in block 310 of the method 300, the processor may assign a session key associated with the assigned private path for accessing the segments of the time-shifted playback of the live media content. In this context, the determination as to whether the subsequent content request for playback of a second live media content is received in determination block 314 may include determining whether the subsequent content request includes the assigned session key. In various embodiments, the assignment of the session key in block 320 may be performed primarily or entirely by one or more processors in any one or more of a variety of CDN computing devices (e.g., the edge server 115, epoxy object gateway 120, player proxy 130, object store 140, or metadata database 145). Following the operations in block 320, the processor may perform the operations in block 312 as described. In some embodiments, the processor may repeat the operations in determination block 314 and blocks 310, 312, 316, 318, and 320 to periodically or continuously set up and operate a system for deploying live media content as a time-shifted playback.

Figure 3C:
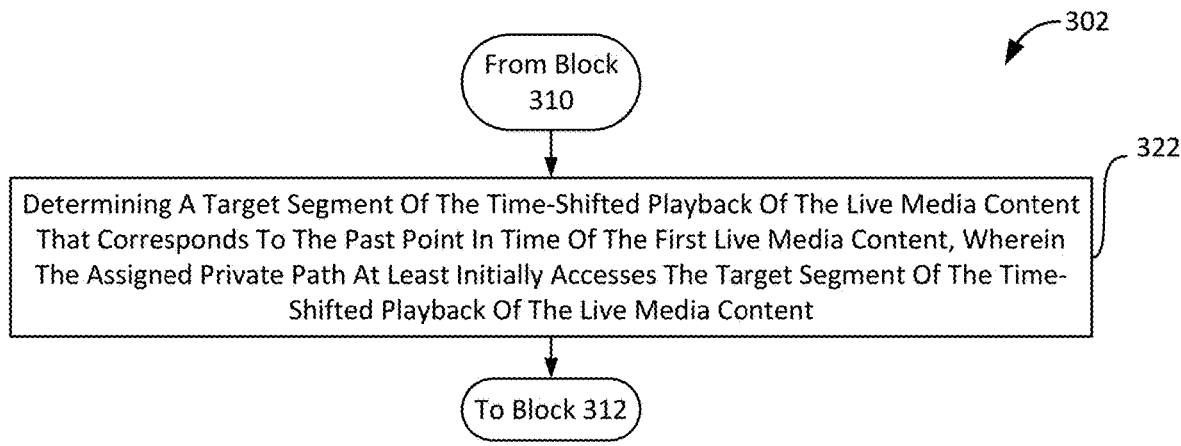

FIG. 3C illustrates the method 302, in accordance with one or more embodiments. In block 322, following the operations in block 310 of the method 300, the processor may determine a target segment of the time-shifted playback of the live media content that corresponds to the past point in time of the first live media content. The assigned private path at least initially accesses the target segment of the time-shifted playback of the live media content. As a non-limiting example, the client computing device may have transmitted a 'play' command, following use of the pause or rewind functions, that corresponds to a point in time in the live media content that is 10 minutes in the past (i.e., was published 10 minutes ago). Thus, the processor may determine which stored object files and completion data, which together form a target segment, are associated with the live media content airing 10 minutes ago. In various embodiments, the determination of the target segment in block 322 may be performed primarily or entirely by one or more processors in any one or more of a variety of CDN computing devices (e.g., the edge server 115, epoxy object gateway 120, player proxy 130, object store 140, or metadata database 145). Following the operations in block 322, the processor may perform the operations in block 312 as described. In some embodiments, the processor may repeat the operations in determination block 314 and blocks 310, 312, 316, 318, and 322 to periodically or continuously set up and operate a system for deploying live media content as a time-shifted playback.

Figure 3D:
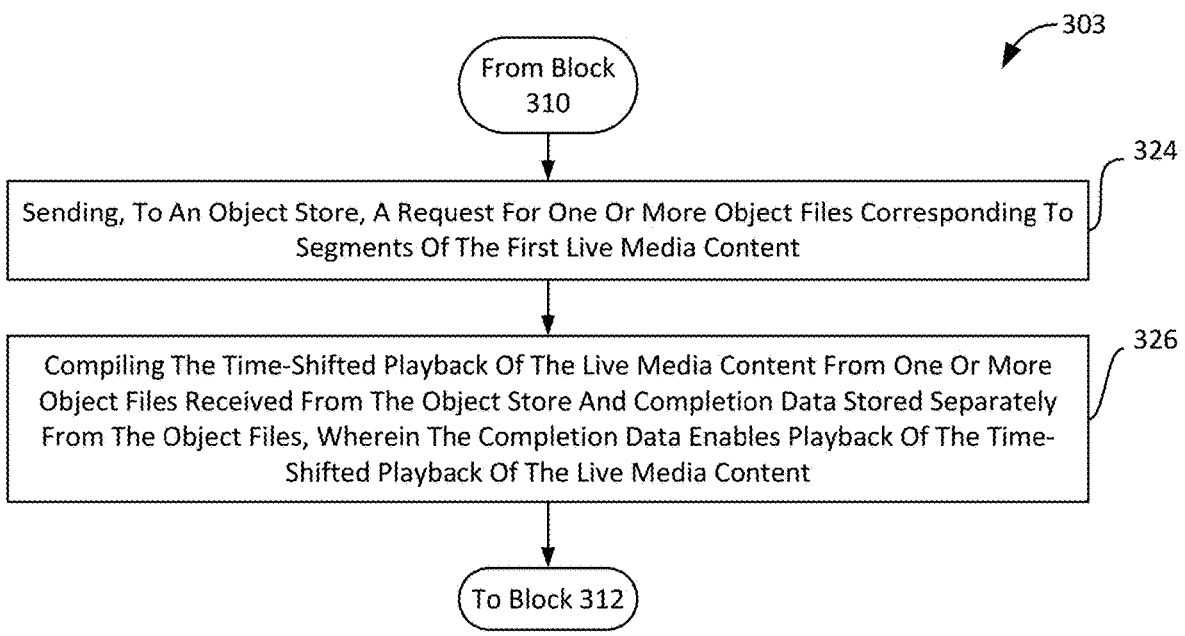

FIG. 3D illustrates the method 303, in accordance with one or more embodiments. In block 324, following the operations in block 310 of the method 300, the processor may send, to an object store (e.g., 140 in FIG. 1), a request for one or more object files corresponding to segments of the first live media content. The request in block 324 may be sent by one or more processors through a transceiver (e.g., 505 and 608 in FIGS. 5 and 6). In various embodiments, the transmission of the request for one or more object files in block 324 may be performed primarily or entirely by one or more processors in any one or more of a variety of CDN computing devices (e.g., the edge server 115, epoxy object gateway 120, player proxy 130, object store 140, or metadata database 145).

In block 326, the processor may compile the time-shifted playback of the live media content from one or more object files received from the object store and completion data stored separately from the object files. The completion data enables playback of the time-shifted playback of the live media content. As a non-limiting example, the processor may join an appropriate object file stored in the object store (e.g., 140) with missing segments of the stored live media content that were saved in the metadata database (e.g., 145) in a way that creates a unique copy of the live media content. For example, one or bytes of data may be added or left out of the compiled time-shifted playback to make the compiled segment unique. In various embodiments, the compilation of the time-shifted playback of the live media content in block 326 may be performed primarily or entirely by one or more processors in any one or more of a variety of CDN computing devices (e.g., the edge server 115, epoxy object gateway 120, player proxy 130, object store 140, or metadata database 145).

Following the operations in block 326, the processor may perform the operations in block 312 as described. In some embodiments, the processor may repeat the operations in determination block 314 and blocks 310, 312, 316, 318, 324 and 326 to periodically or continuously set up and operate a system for deploying live media content as a time-shifted playback.

Figure 3E:
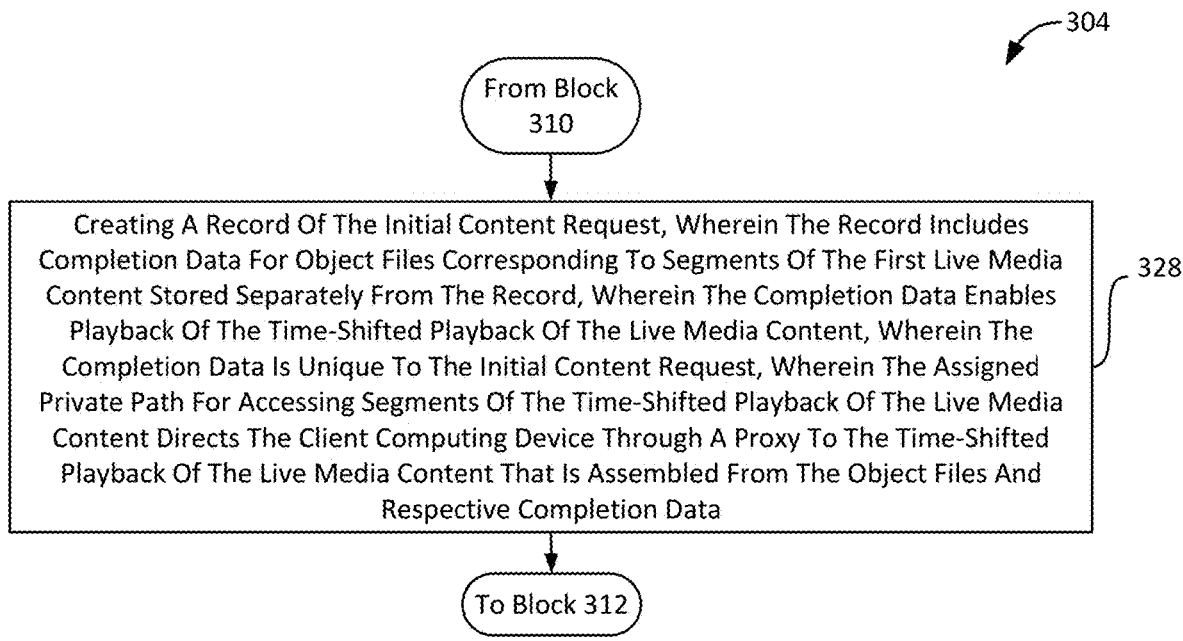

FIG. 3E illustrates the method 304, in accordance with one or more embodiments. In block 328, following the operations in block 310 of the method 300, the processor may create a record of the initial content request. The record may include completion data for object files corresponding to segments of the first live media content stored separately from the record. The completion data may enable the time-shifted playback of the live media content. Also, the completion data may be unique to the initial content request. In some embodiments, the completion data may include information originally part of the live media content that is absent from the object file of the time-shifted playback of the live media content. The assigned private path for accessing segments of the time-shifted playback of the live media content may direct the client computing device through a proxy to the time-shifted playback of the live media content that is assembled from the object files and respective completion data.

In various embodiments, the creation of the record in block 328 may be performed primarily or entirely by one or more processors in any one or more of a variety of CDN computing devices (e.g., the edge server 115, epoxy object gateway 120, player proxy 130, object store 140, or metadata database 145). Following the operations in block 328, the processor may perform the operations in block 312 as described. In some embodiments, the processor may repeat the operations in determination block 314 and blocks 310, 312, 316, 318, and 328 to periodically or continuously set up and operate a system for deploying live media content as a time-shifted playback.

Figure 3F:
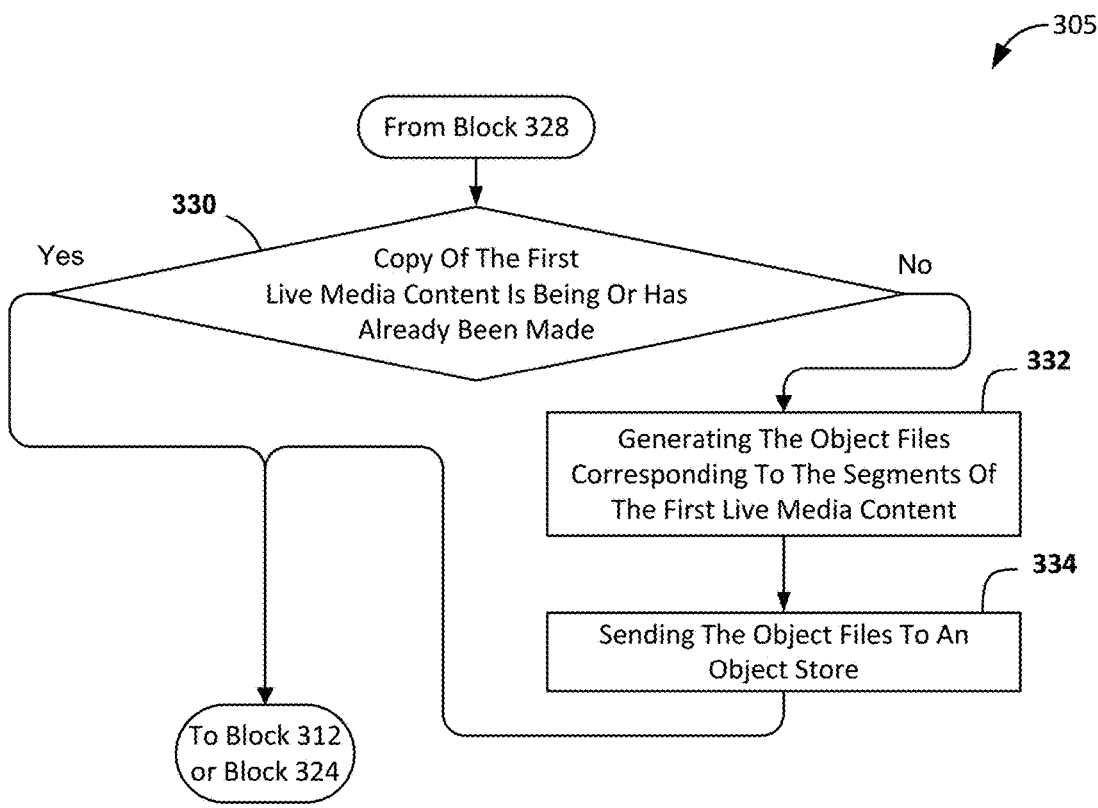

FIG. 3F illustrates the method 305, in accordance with one or more embodiments. In determination block 330, following the operations in block 328 of the method 304, the processor may determine whether a copy of the first live media content is being or has already been made. As a non-limiting example, the processor may determine whether the client computing device associated with the current session has previously requested a time-shifted playback of the subject live media content, in which case that would mean a copy of the first live media content is being made. Similarly, if another client (i.e., someone using a different client computing device) previously requested a time-shifted playback of the subject live media content, the requested period of time was before the subject client computing device sent its initial content request, and the corresponding buffer data has not yet been deleted, in which case that would mean a copy of the first live media content has already been made. In various embodiments, the determination of whether a copy of the first live media content is being or has already been made in block 330 may be performed primarily or entirely by one or more processors in any one or more of a variety of CDN computing devices (e.g., the edge server 115, epoxy object gateway 120, player proxy 130, object store 140, or metadata database 145).

In response to the processor determining that a copy of the first live media content is being or has already been made (i.e., determination block 330="Yes"), the processor may perform the operations in blocks 312 or 324 as described. In response to the processor determining that a copy of the first live media content is not being or has not already been made (i.e., determination block 330="No"), the processor may generate the object files corresponding to the segments of the first live media content in block 332. In various embodiments, the generation of the object files in block 332 may be performed primarily or entirely by one or more processors in any one or more of a variety of CDN computing devices (e.g., the edge server 115, epoxy object gateway 120, player proxy 130, object store 140, or metadata database 145).

In block 334, following the operations in block 332, the processor may send the object files to an object store. The object files in block 334 may be sent by one or more processors through a transceiver (e.g., 505 and 608 in FIGS. 5 and 6). The object files in block 334 may be sent by one or more processors through a transceiver (e.g., 505 and 608 in FIGS. 5 and 6). In various embodiments, the transmission of one or more object files in block 334 may be performed primarily or entirely by one or more processors in any one or more of a variety of CDN computing devices (e.g., the edge server 115, epoxy object gateway 120, player proxy 130, object store 140, or metadata database 145).

Following the operations in block 334, the processor may perform the operations in blocks 312 or 324 as described. In some embodiments, the processor may repeat the operations in determination blocks 314 and 330 and blocks 310, 312, 314, 316, 318, 328, 332, and 334 to periodically or continuously set up and operate a system for deploying live media content as a time-shifted playback.

Various embodiments may implement a de-duplication process that reduces the duplication of live media content stored by a computing device for later deployment as a time-shifted playback.

As part of the de-duplication process, the epoxy object gateway, player proxy, or other computing device may determine an Extent ID of a requested live media content identified in a content request. The Extent ID may be determined by running a hash function (e.g., sha3 digest) on the file name of the requested live media content. The hash function may be saved using the checksum for the file itself. For example, in response to a client requesting the video "Video2020-07-04.mpg," located at "/Family Vacations/Summer 2020/Hawaii/Video2020-07-04.mpg," the epoxy object gateway, player proxy, or other computing device may calculate a sha3 digest of sha3(Video2020-07-04.mpg), which may be stored into a variable field (referred to as the "Extent ID" for the requested content). Maintaining Extent IDs for requested content may ensure the integrity of the file and be used to determine whether a particular live media content has previously been requested and/or whether a copy is available. The content request may include a path where the live media content may originally be obtained (e.g., "/Family Vacations/Summer 2020/Hawaii/Video2020-07-04.mpg"), as well as a point-in-time identifier. The point-in-time identifier may identify a past point in time in the requested live media content from which the time-shifted playback of the live media content originates. Thus, the point-in-time identifier indicates the starting point from which the client wants to time-shifted playback to begin. The point-in-time identifier may be a timestamp or an offset value relative to the most recent live media content.

The epoxy object gateway, player proxy, or other computing device may determine whether the requested content Extent ID has already been received from a prior content request. This determination may be made by checking records of prior content requests to determine whether the Extent ID has already been requested. In response to determining that the requested content Extent-ID has already been received from a prior content request, the epoxy object gateway, player proxy, or other computing device may update a record associated with the select live media content file and return an acknowledgement to the client computing device. In response to determining that the requested content Extent-ID has not already been received from a prior content request, the epoxy object gateway, player proxy, or other computing device may create a record that generates the object files and completion data corresponding to select segments of the identified live media content (i.e., the packages received from the packager).

The process of generating the object files and completion data may include creating a record associated with the select live media content file. The record may include a path for accessing the file, a file name, a current time stamp, and the hash function. The record may comprise a light-weight entry (~200 bits of data) written into a database consisting of a path for the file (e.g., a URL), a file name, a current time stamp, and the hash function. The record may include a Bucket ID which includes an Object ID (e.g., sha3("/Family Vacations/Summer 2020/Hawaii/")) and a Checkpoint ID, which is a timestamp (e.g., int(timestamp/60)*60). In this way, rather than copying the content of a live media content file thousands of times for each requesting client, the live media content file is written once and only the light-weight database entries are made to track individual customer requests for that content. Since the light-weight database entries require nominal storage, the de-duplication techniques of various embodiments may drastically reduce storage costs. Also, this de-duplication technique is easily scalable to a cloud or multi-cloud environment. The database entries may provide tracking for where each portion of a file is stored.

In addition to creating the record that generates the object files and completion data, as described above, the epoxy object gateway, player proxy, or other computing device may send a content request to the packager (e.g., 190). The content request may include the requested content Extent-ID in a header thereof.

In response to sending the content request to the packager, the epoxy object gateway, player proxy, or other computing device may receive a payload from the packager and determines whether a payload extent-ID of the payload matches the requested content Extent ID. If the payload extent-ID matches the requested content Extent ID, the epoxy object gateway, player proxy, or other computing device may update a record associated with the select live media content file and return an acknowledgement to the client computing device. If the payload extent-ID does not match the requested content Extent ID, the epoxy object gateway, player proxy, or other computing device may generate the object files and completion data, which includes creating a new record associated with the select live media content file. Additionally, an acknowledgement may be returned to the client computing device that may include a warning that there was a mismatch.

Figure 4A:
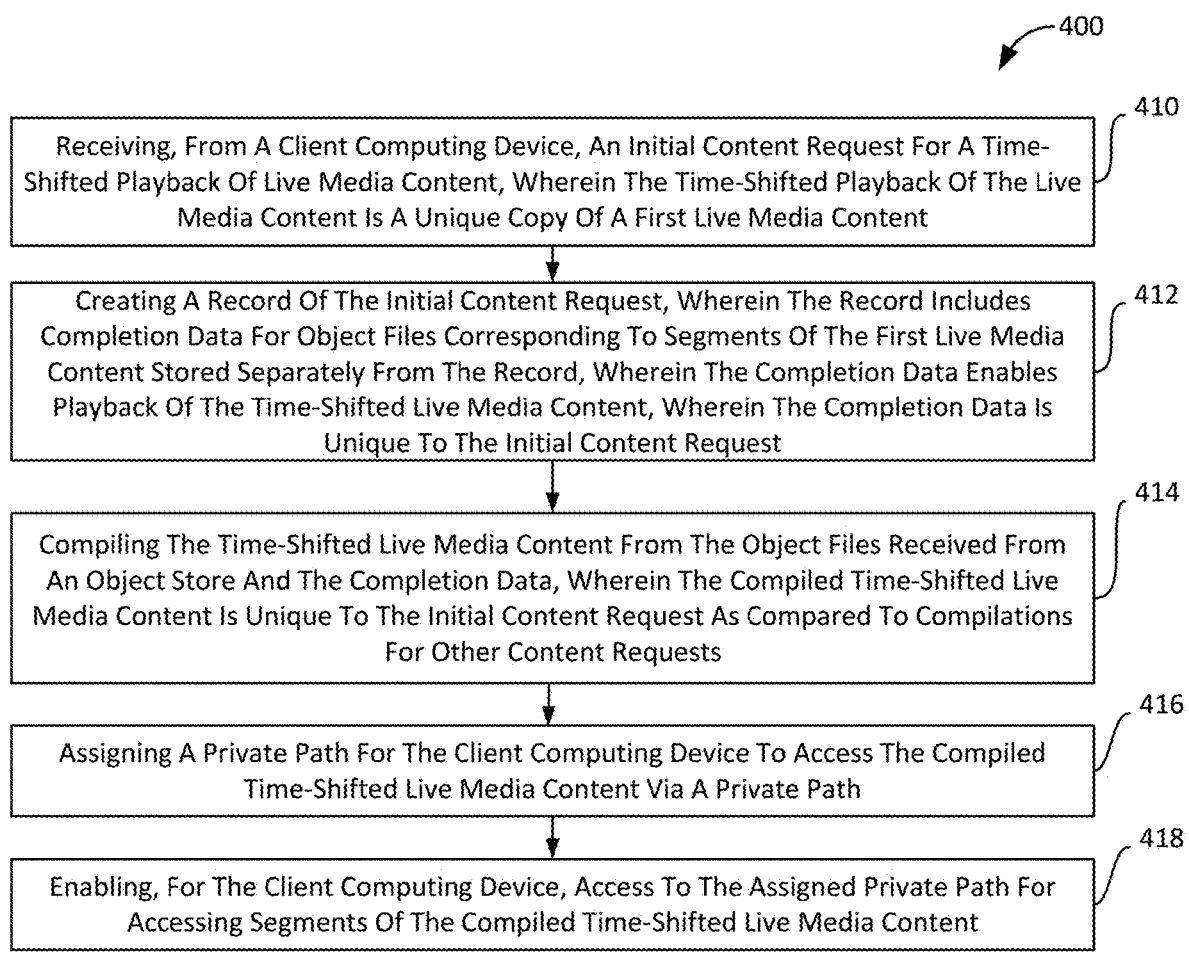
FIGS. 4A and 4B are process flow diagrams illustrating embodiment methods for reducing the duplication of live media content stored by a computing device for later deployment as a time-shifted playback suitable for use with various embodiments.
Figure 4B:
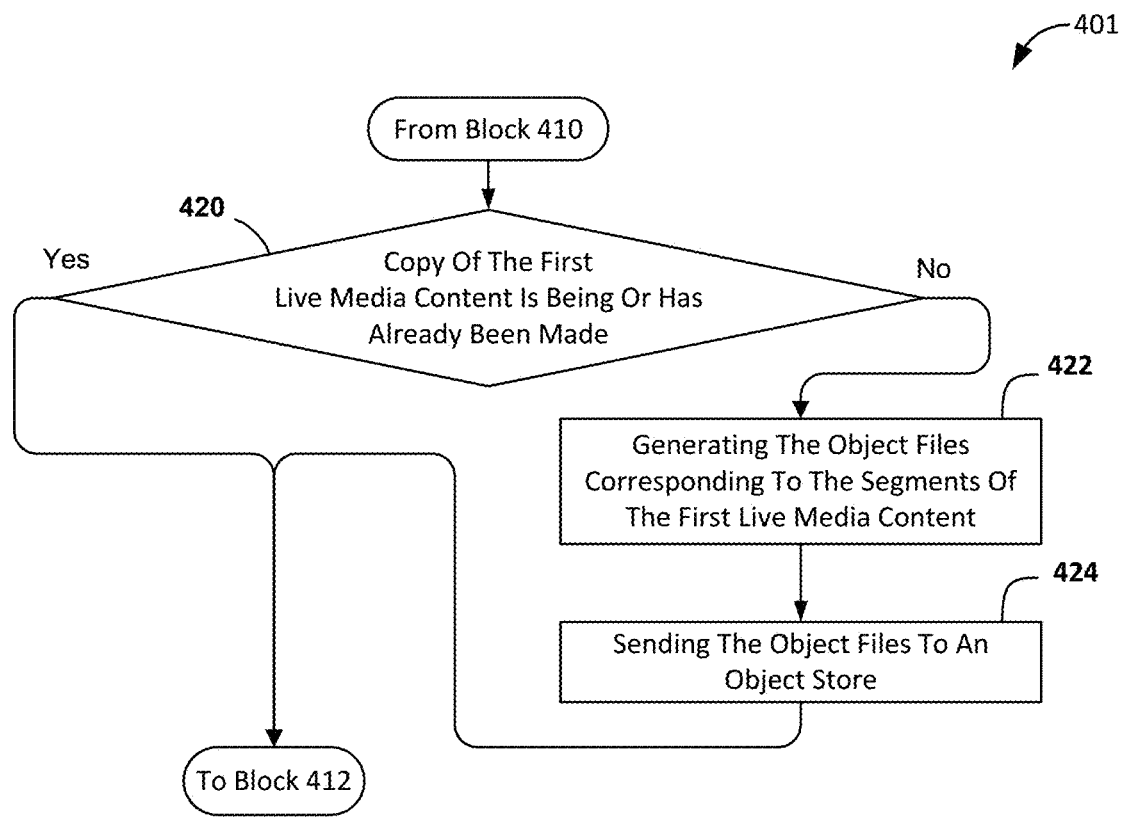

FIGS. 4A and 4B are process flow diagrams that illustrate various operations of a methods 400 and 401 that may be implemented for reducing the duplication of live media content stored by a computing device for later deployment as a time-shifted playback. The operations of the methods 400 and 401 presented below are intended to be illustrative. In some embodiments, the methods 400 and 401 may be accomplished with one or more additional operations not described, and/or without one or more of the operations discussed. Additionally, the order in which the operations of methods 400 and 401 are illustrated in FIGS. 4A and/or 4B and described below is not intended to be limiting.

In some embodiments, methods 400 and 401 may be implemented in one or more processors (e.g., 501, 602, and 604 in FIGS. 5 and 6, respectively) in conjunction with memory (e.g., 502 and 606 in FIGS. 5 and 6). The one or more processor(s) may include one or more device(s) executing some or all of the operations of the methods 400 and 401 in response to instructions stored electronically on an electronic storage medium. The one or more processor(s) may include one or more devices configured through hardware, firmware, and/or software to be specifically designed for execution of one or more of the operations of the methods 400 and 401. For example, with reference to FIGS. 1-4B, the operations of the methods 400 and 401 may be performed primarily or entirely by one or more processors in any one or more of a variety of CDN computing devices (e.g., the edge server 115, epoxy object gateway 120, player proxy 130, object store 140, or metadata database 145).

FIG. 4A illustrates the method 400, in accordance with one or more embodiments. In block 410, the processor may receive, from a client computing device 50, an initial content request for a time-shifted playback of live media content, wherein the time-shifted playback of the live media content is a unique copy of a first live media content. As a non-limiting example, the processor may receive an initial content request from a client computing device 50 that has just tuned-in to a media content programming channel presenting live media content. Alternatively, the client computing device 50 may have been tuned-in to that channel for some time, but now has transmitted a play command after pausing, rewinding, or fast-forwarding the media content being viewed. The reception in block 410 may be received by one or more processors through a transceiver (e.g., 505 and 608 in FIGS. 5 and 6). In various embodiments, the reception of the initial content request in block 410 may be performed primarily or entirely by one or more processors in any one or more of a variety of CDN computing devices (e.g., the edge server 115, epoxy object gateway 120, player proxy 130, object store 140, or metadata database 145).

In block 412, the processor may create a record of the initial content request, wherein the record includes completion data for object files corresponding to segments of the first live media content stored separately from the record, wherein the completion data enables playback of the time-shifted playback of the live media content, wherein the completion data is unique to the initial content request. As a non-limiting example, the processor creating a record may include metadata for object files, including completion data for restoring and making available media content that was originally live to be viewed as a time-shifted playback. In various embodiments, the creation of the record in block 412 may be performed primarily or entirely by one or more processors in any one or more of a variety of CDN computing devices (e.g., the edge server 115, epoxy object gateway 120, player proxy 130, object store 140, or metadata database 145).

In block 414, the processor may compile the time-shifted playback of the live media content from the object files received from an object store and the completion data, wherein the compiled time-shifted playback of the live media content is unique to the initial content request as compared to compilations for other content requests. As a non-limiting example, the compiled time-shifted playback may be unique because a random set of bytes originally contained in one or more packages received from a packager are omitted from the compiled time-shifted playback. In various embodiments, the compilation in block 414 may be performed primarily or entirely by one or more processors in any one or more of a variety of CDN computing devices (e.g., the edge server 115, epoxy object gateway 120, player proxy 130, object store 140, or metadata database 145).

In block 416, the processor may assign a private path for the client computing device 50 to access the compiled time-shifted playback of the live media content via a private path. As a non-limiting example, the private path may be a URL only available to the client computing device 50. In various embodiments, the assignment of the private path in block 416 may be performed primarily or entirely by one or more processors in any one or more of a variety of CDN computing devices (e.g., the edge server 115, epoxy object gateway 120, player proxy 130, object store 140, or metadata database 145).

In block 418, the processor may enable, for the client computing device 50, access to the assigned private path for accessing segments of the compiled time-shifted playback of the live media content. In various embodiments, enabling access in block 418 may be performed primarily or entirely by one or more processors in any one or more of a variety of CDN computing devices (e.g., the edge server 115, epoxy object gateway 120, player proxy 130, object store 140, or metadata database 145).

In some embodiments, the processor may repeat the operations in blocks 410, 412, 414, 416, and 418 to reduce the duplication of live media content stored by a computing device for later deployment as a time-shifted playback.

FIG. 4B illustrates the method 401, in accordance with one or more embodiments. In determination block 420, following the operations in block 410 of the method 401, the processor may determine whether a copy of the first live media content is being or has already been made. As a non-limiting example, the processor may determine whether the client computing device associated with the current session has previously requested a time-shifted playback of the subject live media content, in which case that would mean a copy of the first live media content is being made. Similarly, if another client (i.e., someone using a different client computing device) previously requested a time-shifted playback of the subject live media content, the requested period of time was before the subject client computing device sent its initial content request, and the corresponding buffer data has not yet been deleted, in which case that would mean a copy of the first live media content has already been made. In various embodiments, the determination of whether a copy of the first live media content is being or has already been made in block 330 may be performed primarily or entirely by one or more processors in any one or more of a variety of CDN computing devices (e.g., the edge server 115, epoxy object gateway 120, player proxy 130, object store 140, or metadata database 145).

In response to the processor determining that a copy of the first live media content is being or has already been made (i.e., determination block 420="Yes"), the processor may perform the operations in block 412 as described. In response to the processor determining that a copy of the first live media content is not being or has not already been made (i.e., determination block 420="No"), the processor may generate the object files corresponding to the segments of the first live media content in block 422. In various embodiments, the generation of the object files in block 422 may be performed primarily or entirely by one or more processors in any one or more of a variety of CDN computing devices (e.g., the edge server 115, epoxy object gateway 120, player proxy 130, object store 140, or metadata database 145).

In block 424, following the operations in block 422, the processor may send the object files to an object store. The object files in block 424 may be sent by one or more processors through a transceiver (e.g., 505 and 608 in FIGS. 5 and 6). The object files in block 424 may be sent by one or more processors through a transceiver (e.g., 505 and 608 in FIGS. 5 and 6). In various embodiments, the transmission of one or more object files in block 424 may be performed primarily or entirely by one or more processors in any one or more of a variety of CDN computing devices (e.g., the edge server 115, epoxy object gateway 120, player proxy 130, object store 140, or metadata database 145).

Following the operations in block 424, the processor may perform the operations in block 412 as described. In some embodiments, the processor may repeat the operations in determination block 420 and blocks 410, 412, 414, 416, 418, 422, and 424 to periodically or continuously set up and operate a system for deploying live media content as a time-shifted playback.

The various embodiments (including, but not limited to, embodiments discussed above with reference to FIGS. 1-4B) may also be implemented on any of a variety of CDN computing devices (e.g., the edge server 115, epoxy object gateway 120, player proxy 130, object store 140, or metadata database 145), an example of which is illustrated in FIG. 5 in the form of a server 500. With reference to FIGS. 1-5, the server 500 may include a processor 501 coupled to volatile memory 502. The server 500 may also include one or more connections or port(s) 506 coupled to the processor 501 and configured to input and/or output data from the port(s) 508. The server 500 may storage hard disks 503, 504. The server 500 may also include one or more network transceivers 505, with one or more antenna 506 coupled thereto, providing a network access port, coupled to the processor 501 for establishing wired or wireless network interface connections with a communication network, such as a local area network coupled to other computing devices and routers/switches, the Internet, the public switched telephone network, and/or a cellular network (e.g., CDMA, TDMA, GSM, PCS, 3G, 4G, LTE, or any other type of cellular network). The server 500 may transmit and/or receive data or other communications via the network transceiver 505 and/or the port(s) 508.

Various embodiments (including, but not limited to, embodiments discussed above with reference to FIGS. 1-4B) may be implemented on or in conjunction with a variety of computing devices, an example of which is illustrated in FIG. 6 in the form of a client computing device 50. With reference to FIGS. 1-6, the client computing device 50 may include a first system-on-chip (SoC) 602 (e.g., a SoC-CPU) coupled to a second SoC 604 (e.g., a 5G capable SoC), such as D2D links establish in the dedicated ITS 5.9 GHz spectrum communications. The first and/or second SOCs 602, 604 may be coupled to internal memory 606, a display 612, and to a speaker 614. Additionally, the client computing device 50 may include one or more antenna 624 for sending and receiving electromagnetic radiation that may be connected to one or more wireless transceivers 608 (e.g., a wireless data link and/or cellular transceiver, etc.) coupled to one or more processors in the first and/or second SOCs 602, 604. Client computing devices 50 may also include menu selection buttons or rocker switches 620 for receiving user inputs.

Client computing devices 50 may additionally include a sound encoding/decoding (CODEC) circuit 610, which digitizes sound received from a microphone into data packets suitable for wireless transmission and decodes received sound data packets to generate analog signals that are provided to the speaker to generate sound. Also, one or more of the processors in the first and/or second SOCs 602, 604, wireless transceiver 608 and CODEC circuit 610 may include a digital signal processor (DSP) circuit (not shown separately).

The processors 501, 602, and 604 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 501, 602, and 604. The processors 501, 602, and 604 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 501, 602, and 604 including internal memory or removable memory plugged into the device and memory within the processors 501, 602, and 604 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a computing device to deploy live media content as a time-shifted playback, comprising:
   receiving, from a client computing device, an initial content request for a time-shifted playback of live media content, wherein the time-shifted playback of the live media content uses a unique copy of a first live media content configured for playback associated with the initial content request and is generated by changing a part of the first live media content into a unique playback version of the first live media content, wherein the initial content request indicates a past point in time in the first live media content from which the time-shifted playback of the live media content originates;
   enabling, for the client computing device, access to an assigned private path for accessing segments of the time-shifted playback of the live media content starting from a requested segment that corresponds to the indicated past point in time;
   determining whether a subsequent content request for playback of a second live media content is received; and
   preventing access by the client computing device to further segments of the time-shifted playback of the live media content in response to determining that the subsequent content request for playback of the second live media content is received.

2. The method of claim 1, further comprising:
   maintaining access by the client computing device to further segments of the time-shifted playback of the live media content in response to determining that the subsequent content request for playback of the second live media content is not received.

3. The method of claim 1, wherein preventing access by the client computing device to further segments of the time-shifted playback of the live media content includes deleting one or more segments of the time-shifted playback of the live media content from a buffer.

4. The method of claim 1, further comprising:
   assigning a session key associated with the assigned private path for accessing the segments of the time-shifted playback of the live media content, wherein determining whether the subsequent content request for playback of the second live media content is received includes determining whether the subsequent content request includes the assigned session key.

5. The method of claim 1, wherein the initial content request includes a time interval that provides the indication of the past point in time of the first live media content from which the playback of the time-shifted playback of the live media content should begin.

6. The method of claim 1, further comprising:
   determining a target segment of the time-shifted playback of the live media content that corresponds to the past point in time of the first live media content, wherein the assigned private path at least initially accesses the target segment of the time-shifted playback of the live media content.

7. The method of claim 1, further comprising:
   sending, to an object store, a request for one or more object files corresponding to segments of the first live media content; and compiling the time-shifted playback of the live media content from one or more object files received from the object store and completion data stored separately from the object files, wherein the completion data enables playback of the time-shifted playback of the live media content.

8. The method of claim 1, further comprising:
creating a record of the initial content request, wherein the record includes completion data for object files corresponding to segments of the first live media content stored separately from the record, wherein the completion data enables the time-shifted playback of the live media content, wherein the completion data is unique to the initial content request, wherein the assigned private path for accessing segments of the time-shifted playback of the live media content directs the client computing device through a proxy to the time-shifted playback of the live media content that is assembled from the object files and respective completion data.

9. The method of claim 8, wherein the completion data includes information originally part of the live media content that is absent from the object files of the time-shifted playback of the live media content.

10. The method of claim 8, further comprising:
determining whether a copy of the first live media content is being or has already been made; and
in response to determining that no copy of the first live media content is being or has already been made:
generating the object files corresponding to the segments of the first live media content; and
sending the object files to an object store.

11. A computing device comprising:
a transceiver; and
a processor coupled to the transceiver, wherein the processor is configured with processor-executable instructions to perform operations for a computing device to deploy live media content as a time-shifted playback, comprising:
receiving, from a client computing device, an initial content request for a time-shifted playback of live media content, wherein the time-shifted playback of the live media content uses a unique copy of a first live media content configured for playback associated with the initial content request and is generated by changing a part of the first live media content into a unique playback version of the first live media content, wherein the initial content request indicates a past point in time in the first live media content from which the time-shifted playback of the live media content originates;
enabling, for the client computing device, access to an assigned private path for accessing segments of the time-shifted playback of the live media content starting from a requested segment that corresponds to the indicated past point in time;
determining whether a subsequent content request for playback of a second live media content is received; and
preventing access by the client computing device to further segments of the time-shifted playback of the live media content in response to determining that the subsequent content request for playback of the second live media content is received.

12. The computing device of claim 11, wherein the processor is configured with processor-executable instructions to perform operations further comprising:
maintaining access by the client computing device to further segments of the time-shifted playback of the live media content in response to determining that the subsequent content request for playback of the second live media content is not received.

13. The computing device of claim 11, wherein the processor is configured with processor-executable instructions to perform operations such that preventing access by the client computing device to further segments of the time-shifted playback of the live media content includes deleting one or more segments of the time-shifted playback of the live media content from a buffer.

14. The computing device of claim 11, wherein the processor is configured with processor-executable instructions to perform operations further comprising:
assigning a session key associated with the assigned private path for accessing the segments of the time-shifted playback of the live media content, wherein determining whether the subsequent content request for playback of the second live media content is received includes determining whether the subsequent content request includes the assigned session key.

15. The computing device of claim 11, wherein the processor is configured with processor-executable instructions to perform operations such that the initial content request includes a time interval that provides the indication of the past point in time of the first live media content from which the playback of the time-shifted playback of the live media content should begin.

16. The computing device of claim 11, wherein the processor is configured with processor-executable instructions to perform operations further comprising:
determining a target segment of the time-shifted playback of the live media content that corresponds to the past point in time of the first live media content, wherein the assigned private path at least initially accesses the target segment of the time-shifted playback of the live media content.

17. The computing device of claim 11, further comprising:
sending, to an object store, a request for one or more object files corresponding to segments of the first live media content; and
compiling the time-shifted playback of the live media content from one or more object files received from the object store and completion data stored separately from the object files, wherein the completion data enables playback of the time-shifted playback of the live media content.

18. The computing device of claim 11, further comprising:
creating a record of the initial content request, wherein the record includes completion data for object files corresponding to segments of the first live media content stored separately from the record, wherein the completion data enables the time-shifted playback of the live media content, wherein the completion data is unique to the initial content request, wherein the assigned private path for accessing segments of the time-shifted playback of the live media content directs the client computing device through a proxy to the time-shifted playback of the live media content that is assembled from the object files and respective completion data.

19. The computing device of claim 18, wherein the completion data includes information originally part of the live media content that is absent from the object files of the time-shifted playback of the live media content.

20. The computing device of claim 18, further comprising:
  determining whether a copy of the first live media content is being or has already been made; and
  in response to determining that no copy of the first live media content is being or has already been made:
    generating the object files corresponding to the segments of the first live media content; and
    sending the object files to an object store.

21. A non-transitory processor-readable storage medium having stored thereon processor-executable instructions configured to cause a processor to perform operations for a computing device to deploy live media content as a time-shifted playback, comprising:
  receiving, from a client computing device, an initial content request for a time-shifted playback of live media content, wherein the time-shifted playback of the live media content uses a unique copy of a first live media content configured for playback associated with the initial content request and is generated by changing a part of the first live media content into a unique playback version of the first live media content, wherein the initial content request indicates a past point in time in the first live media content from which the time-shifted playback of the live media content originates;
  enabling, for the client computing device, access to an assigned private path for accessing segments of the time-shifted playback of the live media content starting from a requested segment that corresponds to the indicated past point in time;
  determining whether a subsequent content request for playback of a second live media content is received; and
  preventing access by the client computing device to further segments of the time-shifted playback of the live media content in response to determining that the subsequent content request for playback of the second live media content is received.

22. The non-transitory processor-readable storage medium of claim 21, wherein the processor is configured with processor-executable instructions to perform operations further comprising:
  maintaining access by the client computing device to further segments of the time-shifted playback of the live media content in response to determining that the subsequent content request for playback of the second live media content is not received.

23. The non-transitory processor-readable storage medium of claim 21, wherein the processor is configured with processor-executable instructions to perform operations such that preventing access by the client computing device to further segments of the time-shifted playback of the live media content includes deleting one or more segments of the time-shifted playback of the live media content from a buffer.

24. The non-transitory processor-readable storage medium of claim 21, wherein the processor is configured with processor-executable instructions to perform operations further comprising:
  assigning a session key associated with the assigned private path for accessing the segments of the time-shifted playback of the live media content, wherein determining whether the subsequent content request for playback of the second live media content is received includes determining whether the subsequent content request includes the assigned session key.

25. The non-transitory processor-readable storage medium of claim 21, wherein the processor is configured with processor-executable instructions to perform operations such that the initial content request includes a time interval that provides the indication of the past point in time of the first live media content from which the playback of the time-shifted playback of the live media content should begin.

26. The non-transitory processor-readable storage medium of claim 21, wherein the processor is configured with processor-executable instructions to perform operations further comprising:
  determining a target segment of the time-shifted playback of the live media content that corresponds to the past point in time of the first live media content, wherein the assigned private path at least initially accesses the target segment of the time-shifted playback of the live media content.

27. The non-transitory processor-readable storage medium of claim 21, wherein the processor is configured with processor-executable instructions to perform operations further comprising:
  sending, to an object store, a request for one or more object files corresponding to segments of the first live media content; and
  compiling the time-shifted playback of the live media content from one or more object files received from the object store and completion data stored separately from the object files, wherein the completion data enables playback of the time-shifted playback of the live media content.

28. The non-transitory processor-readable storage medium of claim 21, wherein the processor is configured with processor-executable instructions to perform operations further comprising:
  creating a record of the initial content request, wherein the record includes completion data for object files corresponding to segments of the first live media content stored separately from the record, wherein the completion data enables the time-shifted playback of the live media content, wherein the completion data is unique to the initial content request, wherein the assigned private path for accessing segments of the time-shifted playback of the live media content directs the client computing device through a proxy to the time-shifted playback of the live media content that is assembled from the object files and respective completion data.

29. The non-transitory processor-readable storage medium of claim 28, wherein the processor is configured with processor-executable instructions to perform operations such that the completion data includes information originally part of the live media content that is absent from the object files of the time-shifted playback of the live media content.

30. The non-transitory processor-readable storage medium of claim 28, wherein the processor is configured with processor-executable instructions to perform operations further comprising:
  determining whether a copy of the first live media content is being or has already been made; and
  in response to determining that no copy of the first live media content is being or has already been made:
    generating the object files corresponding to the segments of the first live media content; and
    sending the object files to an object store.

* * * * *